US012763361B2

(12) United States Patent
Harrup

(10) Patent No.: US 12,763,361 B2
(45) Date of Patent: Oct. 13, 2026

(54) ELECTROLYTE SOLVENT FORMULATION

(71) Applicant: New Dominion Enterprises, Inc., Austin, TX (US)

(72) Inventor: Mason K. Harrup, Idaho Falls, ID (US)

(73) Assignee: New Dominion Enterprises, Inc., San Antonio, TX (US)

( * ) Notice: Subject to any disclaimer, the term of this patent is extended or adjusted under 35 U.S.C. 154(b) by 969 days.

(21) Appl. No.: 17/687,638

(22) Filed: Mar. 5, 2022

(65) Prior Publication Data

US 2022/0190384 A1 Jun. 16, 2022

Related U.S. Application Data

(60) Continuation of application No. 16/921,826, filed on Jul. 6, 2020, now Pat. No. 11,271,248, which is a division of application No. 15/082,780, filed on Mar. 28, 2016, now Pat. No. 10,707,526.

(60) Provisional application No. 62/139,552, filed on Mar. 27, 2015.

(51) Int. Cl.

| | |
|---|---|
| ***H01M 10/0563*** | (2010.01) |
| ***H01M 4/36*** | (2006.01) |
| ***H01M 10/0525*** | (2010.01) |
| ***H01M 10/056*** | (2010.01) |
| ***H01M 10/42*** | (2006.01) |

(52) U.S. Cl.

CPC ........ *H01M 10/0563* (2013.01); *H01M 4/366* (2013.01); *H01M 10/0525* (2013.01); *H01M 10/056* (2013.01); *H01M 10/4235* (2013.01); *H01M 2300/002* (2013.01); *H01M 2300/0094* (2013.01)

(58) Field of Classification Search

CPC ........... H01M 10/0525; H01M 10/056; H01M 10/0563; H01M 10/4235; H01M 2300/002; H01M 2300/0094; H01M 4/366; H01M 2300/0034; H01M 4/523; H01M 4/502; H01M 4/38; H01M 4/745; H01M 4/661; H01M 4/808; H01M 4/362; H01M 4/583; H01M 4/5805; H01M 4/483; H01M 4/382; H01M 4/364; H01M 4/134; H01M 4/133; H01M 2300/0071; H01M 10/0562; H01M 10/054; H01M 2004/027; H01M 4/622; H01M 4/623; H01M 4/387; H01M 4/587; H01M 4/485; H01M 4/386; H01M 2300/0037; H01M 4/131; H01M 4/136; H01M 2300/0025; H01M 2004/028; H01M 4/525; H01M 4/505; H01M 4/5825; H01M 10/0569; H01M 10/052; H01M 10/0568; H01M 10/0567

See application file for complete search history.

(56) References Cited

U.S. PATENT DOCUMENTS

| | | | |
|---|---|---|---|
| 4,248,868 | A | 2/1981 | Scartazzini |
| 4,613,676 | A | 9/1986 | Fuhrer |
| 4,719,288 | A | 1/1988 | Fuhrer |
| 4,722,877 | A | 2/1988 | Sammells |
| 4,727,060 | A | 2/1988 | Buhlmayer |
| 4,772,433 | A | 9/1988 | Hesse |
| 4,803,137 | A | 2/1989 | Miyazaki |
| 4,810,599 | A | 3/1989 | Kondo |
| 4,828,945 | A | 5/1989 | Nagata |
| 4,863,817 | A | 9/1989 | Ogino |
| 4,863,903 | A | 9/1989 | Fuhrer |
| 4,865,932 | A | 9/1989 | Masuda |
| 4,904,553 | A | 2/1990 | Nakajima |
| 4,931,591 | A | 6/1990 | Buhlmayer |
| 4,938,571 | A | 7/1990 | Cogan |
| 4,939,050 | A | 7/1990 | Toyosawa |
| 4,941,961 | A | 7/1990 | Noguchi |
| 4,971,897 | A | 11/1990 | Chen |
| 4,985,317 | A | 1/1991 | Adachi |
| 5,041,346 | A | 8/1991 | Giles |
| 5,061,581 | A | 10/1991 | Narang |
| 5,110,694 | A | 5/1992 | Nagasubramanian |
| 5,114,809 | A | 5/1992 | Nakacho |
| 5,124,075 | A | 6/1992 | Yasuda |
| 5,153,080 | A | 10/1992 | Inubushi |
| 5,153,082 | A | 10/1992 | Ogino |
| 5,174,923 | A | 12/1992 | Chen |
| 5,176,969 | A | 1/1993 | Miyabayashi |
| 5,180,645 | A | 1/1993 | More |
| 5,188,783 | A | 2/1993 | Pierce |

(Continued)

OTHER PUBLICATIONS

U.S. Appl. No. 10/707,526, filed Jul. 7, 2020, Mason K. Harrup.
U.S. Appl. No. 10/707,531, filed Jul. 7, 2020, Mason K. Harrup.
U.S. Appl. No. 11/271,248, filed Mar. 8, 2022, Mason K. Harrup.
U.S. Appl. No. 11/517,876, filed Dec. 6, 2022, Mazen Khaled Nazal.
U.S. Appl. No. 11/888,119, filed Jan. 30, 2024, Bor Z. Jang.
U.S. Appl. No. 12/075,704, filed Aug. 27, 2024, Soma Guhathakurta.
U.S. Appl. No. 12/178,432, filed Dec. 31, 2024, Baxter, III, Chester O.

*Primary Examiner* — Adam A Arciero
(74) *Attorney, Agent, or Firm* — Hoffberg & Associates; Steven M. Hoffberg

(57) ABSTRACT

An all-inorganic electrolyte formulation for use in a lithium-ion battery system comprising at least one of each a phosphoranimine, a phosphazene, a monomeric organophosphate and a supporting lithium salt. The electrolyte preferably has a melting point below 0° C., and a vapor pressure of combustible components at 60.6° C. sufficiently low to not produce a combustible mixture in air, e.g., less than 40 mmHg at 30° C. The phosphoranimine, phosphazene, and monomeric phosphorus compound preferably do not have any direct halogen-phosphorus bonds. A solid electrolyte interface layer formed by the electrolyte with an electrode is preferably thermally stable ≥80° C.

20 Claims, 2 Drawing Sheets

(56) References Cited

U.S. PATENT DOCUMENTS

| | | | |
|---|---|---|---|
| 5,190,695 | A | 3/1993 | Sotomura |
| 5,196,484 | A | 3/1993 | Giles |
| RE34,469 | E | 12/1993 | Cogan |
| 5,330,856 | A | 7/1994 | Gonzalez |
| 5,337,184 | A | 8/1994 | Helms |
| 5,358,801 | A | 10/1994 | Brodd |
| 5,384,213 | A | 1/1995 | Olsen |
| 5,407,593 | A | 4/1995 | Whang |
| 5,410,016 | A | 4/1995 | Hubbell |
| 5,420,000 | A | 5/1995 | Patel |
| 5,426,005 | A | 6/1995 | Eschbach |
| 5,429,890 | A | 7/1995 | Pynenburg |
| 5,432,425 | A | 7/1995 | Lundquist |
| 5,436,549 | A | 7/1995 | Lundquist |
| 5,443,601 | A | 8/1995 | Doeff |
| 5,451,476 | A | 9/1995 | Josefowicz |
| 5,453,261 | A | 9/1995 | Saidi |
| 5,474,860 | A | 12/1995 | Abraham |
| 5,491,040 | A | 2/1996 | Chaloner-Gill |
| 5,500,583 | A | 3/1996 | Buckley |
| 5,506,073 | A | 4/1996 | Angell |
| 5,508,129 | A | 4/1996 | Barker |
| 5,508,130 | A | 4/1996 | Golovin |
| 5,518,839 | A | 5/1996 | Olsen |
| 5,532,082 | A | 7/1996 | Saidi |
| 5,541,020 | A | 7/1996 | Golovin |
| 5,542,163 | A | 8/1996 | Chang |
| 5,548,055 | A | 8/1996 | Narang |
| 5,550,454 | A | 8/1996 | Buckley |
| 5,567,547 | A | 10/1996 | Golovin |
| 5,567,783 | A | 10/1996 | Allcock |
| 5,569,560 | A | 10/1996 | Olsen |
| 5,576,120 | A | 11/1996 | Saidi |
| 5,578,399 | A | 11/1996 | Olsen |
| 5,591,545 | A | 1/1997 | Miyashita |
| 5,595,837 | A | 1/1997 | Olsen |
| 5,612,153 | A | 3/1997 | Moulton |
| 5,620,810 | A | 4/1997 | Golovin |
| 5,626,863 | A | 5/1997 | Hubbell |
| 5,633,098 | A | 5/1997 | Narang |
| 5,660,948 | A | 8/1997 | Barker |
| 5,672,446 | A | 9/1997 | Barker |
| 5,672,465 | A | 9/1997 | Patel |
| 5,685,632 | A | 11/1997 | Schaller |
| 5,698,338 | A | 12/1997 | Barker |
| 5,698,664 | A | 12/1997 | Allcock |
| 5,700,298 | A | 12/1997 | Shi |
| 5,707,760 | A | 1/1998 | Stux |
| 5,725,968 | A | 3/1998 | Sato |
| 5,728,489 | A | 3/1998 | Gao |
| 5,731,104 | A | 3/1998 | Ventura |
| 5,744,264 | A | 4/1998 | Barker |
| 5,753,388 | A | 5/1998 | Koksbang |
| 5,756,231 | A | 5/1998 | Andrei |
| 5,780,182 | A | 7/1998 | Barker |
| 5,783,333 | A | 7/1998 | Mayer |
| 5,786,110 | A | 7/1998 | Angell |
| 5,789,110 | A | 8/1998 | Saidi |
| 5,824,434 | A | 10/1998 | Kawakami |
| 5,843,592 | A | 12/1998 | Barker |
| 5,851,504 | A | 12/1998 | Barker |
| 5,912,093 | A | 6/1999 | Wen |
| 5,962,169 | A | 10/1999 | Angell |
| 5,998,559 | A | 12/1999 | Narang |
| 6,007,947 | A | 12/1999 | Mayer |
| 6,013,393 | A | 1/2000 | Taniuchi |
| 6,015,638 | A | 1/2000 | Ventura |
| 6,060,582 | A | 5/2000 | Hubbell |
| 6,087,426 | A | 7/2000 | Helms |
| 6,096,453 | A | 8/2000 | Grunwald |
| 6,103,419 | A | 8/2000 | Saidi |
| 6,103,426 | A | 8/2000 | Narang |
| 6,146,787 | A | 11/2000 | Harrup |
| 6,168,885 | B1 | 1/2001 | Narang |
| RE37,076 | E | 2/2001 | Barker |
| 6,207,326 | B1 | 3/2001 | Kawakami |
| 6,316,149 | B1 | 11/2001 | Garbe |
| 6,379,842 | B1 | 4/2002 | Mayer |
| 6,391,492 | B1 | 5/2002 | Kawakami |
| 6,395,423 | B1 | 5/2002 | Kawakami |
| 6,395,429 | B1 | 5/2002 | Kang |
| 6,413,675 | B1 | 7/2002 | Harada |
| 6,413,676 | B1 | 7/2002 | Munshi |
| 6,416,905 | B1 | 7/2002 | Bronstert |
| 6,444,370 | B2 | 9/2002 | Barker |
| 6,447,952 | B1 | 9/2002 | Spiegel |
| 6,472,104 | B1 | 10/2002 | Ulrich |
| 6,475,679 | B1 | 11/2002 | Tsutiya |
| 6,475,680 | B1 | 11/2002 | Arai |
| 6,492,449 | B2 | 12/2002 | Michot |
| 6,544,690 | B1 | 4/2003 | Harrup |
| 6,599,664 | B2 | 7/2003 | Ehrlich |
| 6,605,237 | B2 | 8/2003 | Allcock |
| 6,645,675 | B1 | 11/2003 | Munshi |
| 6,664,006 | B1 | 12/2003 | Munshi |
| 6,699,623 | B1 | 3/2004 | Dai |
| 6,721,168 | B2 | 4/2004 | Takeuchi |
| 6,723,349 | B1 | 4/2004 | Hill |
| 6,759,164 | B2 | 7/2004 | Palazzo |
| 6,759,460 | B2 | 7/2004 | Kamo |
| 6,797,019 | B2 | 9/2004 | Takeuchi |
| 6,815,119 | B2 | 11/2004 | Schmidt |
| 6,828,065 | B2 | 12/2004 | Munshi |
| 6,841,301 | B2 | 1/2005 | Heider |
| 6,893,774 | B2 | 5/2005 | Schmidt |
| 6,908,186 | B2 | 6/2005 | Zheng |
| 6,955,867 | B1 | 10/2005 | Otsuki |
| 7,005,206 | B2 | 2/2006 | Lawrence |
| 7,008,564 | B2 | 3/2006 | Harrup |
| 7,052,805 | B2 | 5/2006 | Narang |
| 7,060,744 | B2 | 6/2006 | Murakami |
| 7,067,219 | B2 | 6/2006 | Otsuki |
| 7,077,516 | B2 | 7/2006 | Chen |
| 7,081,320 | B2 | 7/2006 | Kawakami |
| 7,084,290 | B2 | 8/2006 | Ignatyev |
| 7,091,266 | B2 | 8/2006 | Murakami |
| 7,094,501 | B2 | 8/2006 | Blau |
| 7,099,142 | B2 | 8/2006 | Otsuki |
| 7,118,694 | B2 | 10/2006 | Bronstert |
| 7,226,702 | B2 | 6/2007 | Oh |
| 7,229,719 | B2 | 6/2007 | Otsuki |
| 7,238,450 | B2 | 7/2007 | Howard, Jr. |
| 7,247,740 | B2 | 7/2007 | Schmidt |
| 7,273,597 | B2 | 9/2007 | Takeuchi |
| 7,282,295 | B2 | 10/2007 | Visco |
| 7,282,296 | B2 | 10/2007 | Visco |
| 7,282,302 | B2 | 10/2007 | Visco |
| 7,285,362 | B2 | 10/2007 | Harrup |
| 7,316,855 | B2 | 1/2008 | Lawrence |
| 7,378,193 | B2 | 5/2008 | Kang |
| 7,390,591 | B2 | 6/2008 | Visco |
| 7,410,731 | B2 | 8/2008 | Yoon |
| 7,429,433 | B2 | 9/2008 | Otsuki |
| 7,473,491 | B1 | 1/2009 | Amine |
| 7,491,458 | B2 | 2/2009 | Visco |
| 7,494,745 | B2 | 2/2009 | Kim |
| 7,498,102 | B2 | 3/2009 | Oh |
| 7,524,439 | B2 | 4/2009 | Otsuki |
| 7,557,637 | B2 | 7/2009 | Sakamoto |
| 7,560,595 | B2 | 7/2009 | Otsuki |
| 7,579,118 | B2 | 8/2009 | Lee |
| 7,582,380 | B1 | 9/2009 | Dunstan |
| 7,585,587 | B2 | 9/2009 | Kanno |
| 7,585,994 | B2 | 9/2009 | Ignatyev |
| 7,588,859 | B1 | 9/2009 | Oh |
| 7,598,002 | B2 | 10/2009 | Gorkovenko |
| 7,608,178 | B2 | 10/2009 | De Jonghe |
| 7,645,543 | B2 | 1/2010 | Visco |
| 7,656,125 | B2 | 2/2010 | Lampe-Onnerud |
| 7,666,233 | B2 | 2/2010 | Visco |
| 7,678,505 | B2 | 3/2010 | Lee |
| 7,691,289 | B2 | 4/2010 | Okun |
| 7,695,860 | B2 | 4/2010 | Amine |
| 7,695,862 | B2 | 4/2010 | Otsuki |

(56) References Cited

U.S. PATENT DOCUMENTS

| | | | |
|---|---|---|---|
| 7,704,468 | B1 | 4/2010 | Klaehn |
| 7,713,449 | B2 | 5/2010 | Adachi |
| 7,718,321 | B2 | 5/2010 | Yoon |
| 7,718,826 | B2 | 5/2010 | Otsuki |
| 7,759,418 | B2 | 7/2010 | Murakami |
| 7,781,105 | B2 | 8/2010 | Lee |
| 7,781,108 | B2 | 8/2010 | Visco |
| 7,811,707 | B2 | 10/2010 | Lampe-Onnerud |
| 7,811,708 | B2 | 10/2010 | Lampe-Onnerud |
| 7,820,328 | B1 | 10/2010 | Takeuchi |
| 7,824,800 | B1 | 11/2010 | Dunstan |
| 7,828,728 | B2 | 11/2010 | Boock |
| 7,829,212 | B2 | 11/2010 | Visco |
| 7,838,143 | B2 | 11/2010 | Onnerud |
| 7,838,144 | B2 | 11/2010 | Visco |
| 7,851,090 | B2 | 12/2010 | Park |
| 7,858,223 | B2 | 12/2010 | Visco |
| 7,864,397 | B2 | 1/2011 | Wu |
| 7,875,204 | B2 | 1/2011 | Pan |
| 7,875,393 | B2 | 1/2011 | Ryu |
| 7,939,199 | B1 | 5/2011 | Gan |
| 7,939,206 | B2 | 5/2011 | Otsuki |
| 7,951,495 | B2 | 5/2011 | Otsuki |
| 7,976,983 | B2 | 7/2011 | Nakura |
| 7,977,393 | B2 | 7/2011 | Yoshimura |
| 7,989,109 | B2 | 8/2011 | Lee |
| 7,998,626 | B2 | 8/2011 | Visco |
| 8,000,084 | B2 | 8/2011 | Siggel |
| 8,003,241 | B2 | 8/2011 | Partin |
| 8,003,256 | B2 | 8/2011 | Ohishi |
| 8,012,615 | B2 | 9/2011 | Onnerud |
| 8,030,500 | B2 | 10/2011 | Holenz |
| 8,034,491 | B2 | 10/2011 | Ryu |
| 8,048,569 | B2 | 11/2011 | Fujikawa |
| 8,048,571 | B2 | 11/2011 | Visco |
| 8,062,796 | B2 | 11/2011 | Yoon |
| 8,071,233 | B2 | 12/2011 | Partin |
| 8,076,031 | B1 | 12/2011 | West |
| 8,076,032 | B1 | 12/2011 | West |
| 8,084,998 | B2 | 12/2011 | Lampe-Onnerud |
| 8,092,940 | B2 | 1/2012 | Tabuchi |
| 8,114,171 | B2 | 2/2012 | Visco |
| 8,119,038 | B2 | 2/2012 | Lee |
| 8,124,269 | B2 | 2/2012 | Takahashi |
| 8,133,614 | B1 | 3/2012 | Gan |
| 8,137,844 | B2 | 3/2012 | Awano |
| 8,153,307 | B1 | 4/2012 | Tanaka |
| 8,168,330 | B2 | 5/2012 | Tan |
| 8,168,831 | B2 | 5/2012 | Otsuki |
| 8,178,009 | B2 | 5/2012 | Watanabe |
| 8,182,943 | B2 | 5/2012 | Visco |
| 8,187,749 | B2 | 5/2012 | Takahashi |
| 8,202,649 | B2 | 6/2012 | Visco |
| 8,207,494 | B2 | 6/2012 | Hieftje |
| 8,211,336 | B2 | 7/2012 | Miyasaka |
| 8,221,915 | B2 | 7/2012 | Tikhonov |
| 8,227,103 | B2 | 7/2012 | Tsukamoto |
| 8,236,449 | B2 | 8/2012 | Nakura |
| 8,257,866 | B2 | 9/2012 | Loveness |
| 8,257,870 | B2 | 9/2012 | Horikawa |
| 8,263,697 | B2 | 9/2012 | Miyoshi |
| 8,268,197 | B2 | 9/2012 | Singh |
| 8,287,483 | B2 | 10/2012 | Mitragotri |
| 8,293,398 | B2 | 10/2012 | Visco |
| 8,301,322 | B2 | 10/2012 | Mitsutani |
| 8,308,971 | B1 | 11/2012 | Bhat |
| 8,309,240 | B1 | 11/2012 | Li |
| 8,323,820 | B2 | 12/2012 | Visco |
| 8,334,075 | B2 | 12/2012 | Visco |
| 8,357,450 | B2 | 1/2013 | Miyoshi |
| 8,361,664 | B2 | 1/2013 | Visco |
| 8,367,755 | B2 | 2/2013 | Terada |
| 8,377,596 | B2 | 2/2013 | Kaneko |
| 8,384,058 | B2 | 2/2013 | Green |
| 8,389,147 | B2 | 3/2013 | Visco |
| 8,415,045 | B2 | 4/2013 | Miyajima |
| 8,420,266 | B2 | 4/2013 | Utsumi |
| 8,450,012 | B2 | 5/2013 | Cui |
| 8,455,131 | B2 | 6/2013 | Visco |
| 8,455,141 | B2 | 6/2013 | Nakamura |
| 8,459,213 | B2 | 6/2013 | Moriarty |
| 8,465,871 | B2 | 6/2013 | Juzkow |
| 8,470,472 | B2 | 6/2013 | Nishie |
| 8,486,560 | B2 | 7/2013 | Tartaglia |
| 8,486,565 | B2 | 7/2013 | Hinago |
| 8,501,339 | B2 | 8/2013 | Visco |
| 8,512,896 | B2 | 8/2013 | Ryu |
| 8,512,899 | B2 | 8/2013 | Michot |
| 8,524,399 | B2 | 9/2013 | Kim |
| 8,529,867 | B2 | 9/2013 | Fullerton |
| 8,556,996 | B2 | 10/2013 | Loveness |
| 8,562,873 | B2 | 10/2013 | Murakami |
| 8,574,773 | B2 | 11/2013 | Wilson |
| 8,579,994 | B2 | 11/2013 | Kawaoka |
| 8,592,081 | B2 | 11/2013 | Utsumi |
| 8,597,815 | B2 | 12/2013 | Takahashi |
| 8,597,827 | B2 | 12/2013 | Kako |
| 8,628,873 | B2 | 1/2014 | Kawasoe |
| 8,652,686 | B2 | 2/2014 | Visco |
| 8,652,688 | B2 | 2/2014 | Yushin |
| 8,652,692 | B2 | 2/2014 | Visco |
| 8,658,062 | B2 | 2/2014 | Kumta |
| 8,658,304 | B2 | 2/2014 | Visco |
| 8,669,114 | B2 | 3/2014 | Sundermeyer |
| 8,671,684 | B2 | 3/2014 | Moriarty |
| 8,673,477 | B2 | 3/2014 | Visco |
| 8,673,499 | B2 | 3/2014 | Nakura |
| 8,679,670 | B2 | 3/2014 | Onnerud |
| 8,679,684 | B2 | 3/2014 | Kolosnitsyn |
| 8,686,074 | B2 | 4/2014 | Tanji |
| 8,703,310 | B2 | 4/2014 | Mullin |
| 8,703,344 | B2 | 4/2014 | Bhat |
| 8,709,679 | B2 | 4/2014 | Visco |
| 8,715,863 | B2 | 5/2014 | Zhang |
| 8,728,170 | B1 | 5/2014 | Atanasoska |
| 8,734,668 | B2 | 5/2014 | Bhat |
| 8,734,674 | B1 | 5/2014 | Hersam |
| 8,734,988 | B2 | 5/2014 | Palanichamy |
| 8,741,486 | B1 | 6/2014 | Jacobsen |
| 8,754,138 | B2 | 6/2014 | Michot |
| 8,765,295 | B2 | 7/2014 | West |
| 8,765,803 | B1 | 7/2014 | Wandinger-Ness |
| 8,778,522 | B2 | 7/2014 | Visco |
| 8,778,533 | B2 | 7/2014 | Iwayasu |
| 8,785,022 | B2 | 7/2014 | Sato |
| 8,795,886 | B2 | 8/2014 | Adachi |
| 8,795,903 | B2 | 8/2014 | Smart |
| 8,801,810 | B1 | 8/2014 | Cui |
| 8,802,285 | B2 | 8/2014 | Ryu |
| 8,814,956 | B2 | 8/2014 | Yamazaki |
| 8,815,432 | B2 | 8/2014 | Jo |
| 8,822,084 | B2 | 9/2014 | Tsujioka |
| 8,822,088 | B2 | 9/2014 | Tajima |
| 8,828,573 | B2 | 9/2014 | Visco |
| 8,828,574 | B2 | 9/2014 | Visco |
| 8,828,575 | B2 | 9/2014 | Visco |
| 8,828,605 | B2 | 9/2014 | Lampe-Onnerud |
| 8,841,035 | B2 | 9/2014 | Choi |
| 8,845,764 | B2 | 9/2014 | Kuriki |
| 8,846,249 | B2 | 9/2014 | Nakura |
| 8,846,251 | B2 | 9/2014 | Cui |
| 8,846,922 | B2 | 9/2014 | Hoge |
| 8,852,801 | B2 | 10/2014 | Takada |
| 8,852,813 | B2 | 10/2014 | Madabusi |
| 8,870,810 | B2 | 10/2014 | Mitragotri |
| 8,871,385 | B2 | 10/2014 | Gering |
| 8,889,301 | B2 | 11/2014 | Balsara |
| 8,900,754 | B2 | 12/2014 | Hinago |
| 8,906,549 | B1 | 12/2014 | Palazzo |
| 8,916,291 | B2 | 12/2014 | Ichihashi |
| 8,922,959 | B2 | 12/2014 | Cho |
| 8,927,127 | B2 | 1/2015 | Hosoya |
| 8,932,771 | B2 | 1/2015 | Visco |
| 8,945,774 | B2 | 2/2015 | Coowar |

(56) References Cited

U.S. PATENT DOCUMENTS 8,974,947 B2 3/2015 Fujii
8,980,602 B2 3/2015 Medoff
8,986,638 B2 3/2015 Ivanovic-Burmazovic
8,986,881 B2 3/2015 Kako
8,999,009 B2 4/2015 Tikhonov
9,012,093 B2 4/2015 Matsumoto
9,012,094 B2 4/2015 Tikhonov
9,051,629 B2 6/2015 Heres
9,061,261 B2 6/2015 Fullerton
9,077,037 B2 7/2015 Hwu
9,077,046 B2 7/2015 Tikhonov
9,093,716 B2 7/2015 Tokuda
9,099,252 B2 8/2015 Liu
9,099,756 B2 8/2015 Choi
9,105,908 B2 8/2015 Peuchert
9,105,942 B2 8/2015 Koga
9,111,684 B2 8/2015 Onagi
9,112,212 B1 8/2015 Fasching
9,118,088 B2 8/2015 Ohashi
9,123,941 B2 9/2015 Visco
9,123,973 B2 9/2015 Lee
9,130,214 B2 9/2015 Wakayama
9,130,245 B2 9/2015 Utsumi
9,136,568 B2 9/2015 Visco
9,142,357 B2 9/2015 Matsumoto
9,147,906 B2 9/2015 Tang
9,166,206 B2 10/2015 Kairawicz
9,166,222 B2 10/2015 Amiruddin
9,166,249 B2 10/2015 Darolles
9,172,076 B2 10/2015 Luski
9,172,088 B2 10/2015 Loveness
9,172,094 B2 10/2015 Loveness
9,183,995 B2 11/2015 Inoue
9,184,467 B2 11/2015 Tikhonov
9,184,468 B2 11/2015 Tikhonov
9,187,834 B2 11/2015 Albrecht
9,187,835 B2 11/2015 Albrecht
9,190,616 B2 11/2015 Paulasaari
9,190,695 B2 11/2015 Okamoto
9,190,698 B2 11/2015 Smart
9,196,926 B2 11/2015 Kaneko
9,200,375 B2 12/2015 Gilliam
9,203,084 B2 12/2015 Wang
9,203,107 B2 12/2015 Kawasaki
9,203,113 B2 12/2015 Miyoshi
9,206,210 B2 12/2015 Gering
9,207,513 B2 12/2015 Milliron
9,209,456 B2 12/2015 Fasching
9,214,659 B2 12/2015 Hörpel
9,219,274 B2 12/2015 Kawasaki
9,227,850 B2 1/2016 Ooishi
9,230,746 B2 1/2016 Miyoshi
9,231,243 B2 1/2016 Cui
9,236,634 B2 1/2016 Cheng
9,236,635 B2 1/2016 Abe
9,240,614 B2 1/2016 Abe
9,246,150 B2 1/2016 Tsujikawa
9,252,399 B2 2/2016 Chamberlain, II
9,257,720 B2 2/2016 Okamoto
9,263,731 B2 2/2016 Tikhonov
9,263,764 B2 2/2016 Roh
9,269,998 B2 2/2016 Hayes
9,273,399 B2 3/2016 Hellring
9,281,541 B2 3/2016 Tokuda
9,281,543 B2 3/2016 Hosoya
9,284,324 B2 3/2016 Nakamura
9,287,560 B2 3/2016 Yu
9,287,573 B2 3/2016 Visco
9,293,749 B2 3/2016 Seo
9,293,787 B2 3/2016 Yawata
9,293,796 B2 3/2016 Lanning
10,707,526 B2 * 7/2020 Harrup .............. H01M 10/0563
11,271,248 B2 * 3/2022 Harrup .............. H01M 10/0563
2001/0004506 A1 6/2001 Gan
2001/0004507 A1 6/2001 Gan
2001/0012590 A1 8/2001 Ehrlich
2001/0031367 A1 10/2001 Gilbert
2002/0014616 A1 2/2002 Allcock
2002/0031701 A1 3/2002 Kawakami
2002/0039275 A1 4/2002 Takeuchi
2002/0048706 A1 4/2002 Mayes
2002/0049201 A1 4/2002 Hale
2002/0055047 A1 5/2002 Satoh
2002/0076611 A1 6/2002 Palazzo
2002/0085968 A1 7/2002 Smalley
2002/0090331 A1 7/2002 Smalley
2002/0090547 A1 7/2002 Schmidt
2002/0094311 A1 7/2002 Smalley
2002/0098135 A1 7/2002 Smalley
2002/0100725 A1 8/2002 Lee
2002/0102196 A1 8/2002 Smalley
2002/0110739 A1 8/2002 McEwen
2002/0122950 A1 9/2002 Ehrlich
2002/0122979 A1 9/2002 Schmidt
2002/0127162 A1 9/2002 Smalley
2002/0127169 A1 9/2002 Smalley
2002/0127454 A1 9/2002 Narang
2002/0128364 A1 9/2002 Michot
2002/0136681 A1 9/2002 Smalley
2002/0136683 A1 9/2002 Smalley
2002/0150524 A1 10/2002 Smalley
2002/0155353 A1 10/2002 Bronstert
2002/0159943 A1 10/2002 Smalley
2002/0160270 A1 10/2002 Bronstert
2002/0161078 A1 10/2002 Zobel
2002/0182488 A1 12/2002 Cho
2002/0185627 A1 12/2002 Chen-Yang
2002/0193533 A1 12/2002 Kamo
2002/0197522 A1 12/2002 Lawrence
2002/0197531 A1 12/2002 Inoue
2003/0003369 A1 1/2003 Dai
2003/0059683 A1 3/2003 Blau
2003/0068555 A1 4/2003 Naruoka
2003/0091904 A1 5/2003 Munshi
2003/0099884 A1 5/2003 Chiang
2003/0108801 A1 6/2003 Otsuki
2003/0113635 A1 6/2003 Gan
2003/0124099 A1 7/2003 Atala
2003/0125437 A1 7/2003 Michot
2003/0129500 A1 7/2003 Gan
2003/0134968 A1 7/2003 Kang
2003/0148191 A1 8/2003 Mori
2003/0170548 A1 9/2003 Otsuki
2003/0175597 A1 9/2003 Otsuki
2003/0175598 A1 9/2003 Otsuki
2003/0180268 A1 9/2003 Atala
2003/0190531 A1 10/2003 Otsuki
2003/0198868 A1 10/2003 Takeuchi
2004/0009404 A1 1/2004 Harrup
2004/0013927 A1 1/2004 Lawrence
2004/0039134 A1 2/2004 Murakami
2004/0053138 A1 3/2004 Otterstedt
2004/0085710 A1 5/2004 Takeuchi
2004/0126305 A1 7/2004 Chen
2004/0126658 A1 7/2004 Otsuki
2004/0126659 A1 7/2004 Graetz
2004/0139587 A1 7/2004 Sato
2004/0142246 A1 7/2004 Han
2004/0146778 A1 7/2004 Lee
2004/0146786 A1 7/2004 Sato
2004/0151985 A1 8/2004 Munshi
2004/0157122 A1 8/2004 Naoi
2004/0158091 A1 8/2004 Ignatyev
2004/0170901 A1 9/2004 Blau
2004/0189762 A1 9/2004 Chen
2004/0189763 A1 9/2004 Zheng
2004/0191635 A1 9/2004 Otsuki
2004/0192853 A1 9/2004 Otsuki
2004/0220348 A1 11/2004 Michot
2004/0225153 A1 11/2004 Allcock
2005/0002915 A1 1/2005 Atala
2005/0008938 A1 1/2005 Cho
2005/0042503 A1 2/2005 Kim
2005/0054116 A1 3/2005 Potyrailo

(56) References Cited

U.S. PATENT DOCUMENTS

2005/0079420 A1 4/2005 Cho
2005/0085655 A1 4/2005 Schmidt
2005/0095197 A1 5/2005 Tuszynski
2005/0095504 A1 5/2005 Kim
2005/0106458 A1 5/2005 Eguchi
2005/0106460 A1 5/2005 Otsuki
2005/0123836 A1 6/2005 Otsuki
2005/0136329 A1 6/2005 Howard
2005/0153207 A1 7/2005 Otsuki
2005/0158626 A1 7/2005 Wagner
2005/0164093 A1 7/2005 Otsuki
2005/0175529 A1 8/2005 Ceder
2005/0175904 A1 8/2005 Gorkovenko
2005/0181280 A1 8/2005 Ceder
2005/0214700 A1 9/2005 Yamamoto
2005/0215764 A1 9/2005 Tuszynski
2005/0221168 A1 10/2005 Dahn
2005/0228087 A1 10/2005 Murakami
2005/0234336 A1 10/2005 Beckman
2005/0244475 A1 11/2005 Edelman
2005/0244477 A1 11/2005 Hughes
2005/0249656 A1 11/2005 Smalley
2005/0249667 A1 11/2005 Tuszynski
2005/0255385 A1 11/2005 Harrup
2005/0260120 A1 11/2005 Smalley
2005/0271705 A1 12/2005 Hughes
2005/0272214 A1 12/2005 Chiang
2005/0277026 A1 12/2005 Nishikawa
2005/0281861 A1 12/2005 Hughes
2005/0281883 A1 12/2005 Daniloff
2006/0024546 A1 2/2006 Loutfy
2006/0032046 A1 2/2006 Nathan
2006/0034943 A1 2/2006 Tuszynski
2006/0035137 A1 2/2006 Maruo
2006/0046151 A1 3/2006 Otsuki
2006/0052478 A1 3/2006 Madsen
2006/0073381 A1 4/2006 Kanno
2006/0105513 A1 5/2006 Afzali-Ardakani
2006/0121355 A1 6/2006 Kolosnitsyn
2006/0147371 A1 7/2006 Tuszynski
2006/0147807 A1 7/2006 Kim
2006/0154144 A1 7/2006 Gorkovenko
2006/0154147 A1 7/2006 Kurihara
2006/0166098 A1 7/2006 Tabuchi
2006/0172200 A1 8/2006 Yoon
2006/0180796 A1 8/2006 Adachi
2006/0182783 A1 8/2006 Hughes
2006/0191843 A1 8/2006 Wudl
2006/0194119 A1 8/2006 Son
2006/0204856 A1 9/2006 Ryu
2006/0210873 A1 9/2006 Hollenkamp
2006/0210883 A1 9/2006 Chen
2006/0217568 A1 9/2006 Ignatyev
2006/0257452 A1 11/2006 Hughes
2006/0269834 A1 11/2006 West
2006/0281010 A1 12/2006 Lee
2006/0281011 A1 12/2006 Lee
2006/0292451 A1 12/2006 Lee
2007/0003807 A1 1/2007 Wudl
2007/0020529 A1 1/2007 Ryu
2007/0026315 A1 2/2007 Lampe-Onnerud
2007/0027129 A1 2/2007 Tuszynski
2007/0029972 A1 2/2007 Lampe-Onnerud
2007/0037046 A1 2/2007 Takahashi
2007/0037063 A1 2/2007 Choi
2007/0040154 A1 2/2007 Murakami
2007/0043158 A1 2/2007 Smalley
2007/0048209 A1 3/2007 Smalley
2007/0048596 A1 3/2007 Hasegawa
2007/0048622 A1 3/2007 Yoon
2007/0048623 A1 3/2007 Park
2007/0054180 A1 3/2007 Miyajima
2007/0059336 A1 3/2007 Hughes
2007/0077496 A1 4/2007 Scott
2007/0088014 A1 4/2007 Edelman
2007/0092549 A1 4/2007 Tuszynski
2007/0117007 A1 5/2007 Visco
2007/0141470 A1 6/2007 Nakura
2007/0149496 A1 6/2007 Tuszynski
2007/0166617 A1 7/2007 Gozdz
2007/0172740 A1 7/2007 Otsuki
2007/0180688 A1 8/2007 Kawakami
2007/0182418 A1 8/2007 Reynier
2007/0183954 A1 8/2007 Ohtsuki
2007/0202413 A1 8/2007 Wudl
2007/0207384 A1 9/2007 Nakura
2007/0212395 A1 9/2007 Donello
2007/0212615 A1 9/2007 Jost
2007/0216469 A1 9/2007 Sakamoto
2007/0243470 A1 10/2007 Yamamoto
2007/0265426 A1 11/2007 Allcock
2007/0269659 A1 11/2007 Gilbert
2007/0298314 A1 12/2007 Partin
2008/0008928 A1 1/2008 Partin
2008/0008933 A1 1/2008 Lampe-Onnerud
2008/0015268 A1 1/2008 Wudl
2008/0020276 A1 * 1/2008 Horikawa ......... H01M 10/0525
429/200
2008/0020285 A1 1/2008 Horikawa
2008/0044736 A1 2/2008 Nakura
2008/0051495 A1 2/2008 Murakami
2008/0063585 A1 3/2008 Smalley
2008/0063588 A1 3/2008 Smalley
2008/0075999 A1 3/2008 Izuhara
2008/0089830 A1 4/2008 Smalley
2008/0096056 A1 4/2008 Harrup
2008/0099734 A1 5/2008 Chiang
2008/0107586 A1 5/2008 Smalley
2008/0107694 A1 5/2008 Trogden
2008/0118428 A1 5/2008 Awano
2008/0118843 A1 5/2008 Tarnopolsky
2008/0119421 A1 5/2008 Tuszynski
2008/0138700 A1 6/2008 Horpel
2008/0152996 A1 6/2008 Thackeray
2008/0153005 A1 6/2008 Horikawa
2008/0160417 A1 7/2008 Yoshimura
2008/0164444 A1 7/2008 Otsuki
2008/0171268 A1 7/2008 Yazami
2008/0176141 A1 7/2008 Pan
2008/0182129 A1 7/2008 Klubek
2008/0193840 A1 8/2008 Shirane
2008/0193848 A1 8/2008 Fujikawa
2008/0213588 A1 9/2008 Chen
2008/0213661 A1 9/2008 Michot
2008/0224100 A1 9/2008 Smalley
2008/0233477 A1 9/2008 Takahashi
2008/0241693 A1 10/2008 Fukuchi
2008/0241699 A1 10/2008 Halalay
2008/0254361 A1 10/2008 Horikawa
2008/0261116 A1 10/2008 Burton
2008/0269492 A1 10/2008 Otsuki
2008/0311025 A1 12/2008 Smalley
2009/0004094 A1 1/2009 Smalley
2009/0005824 A1 1/2009 Visco
2009/0011340 A1 1/2009 Lee
2009/0017364 A1 1/2009 Manev
2009/0023071 A1 1/2009 Ohishi
2009/0027827 A1 1/2009 Siggel
2009/0029138 A1 1/2009 Miyoshi
2009/0029193 A1 1/2009 Onnerud
2009/0035656 A1 2/2009 Lee
2009/0075176 A1 3/2009 Singh
2009/0081547 A1 3/2009 Nakura
2009/0081548 A1 3/2009 Nakura
2009/0082321 A1 3/2009 Edelman
2009/0104523 A1 4/2009 Mullin
2009/0114344 A1 5/2009 Barinov
2009/0117171 A1 5/2009 Francois
2009/0123813 A1 5/2009 Chiang
2009/0130567 A1 5/2009 Segawa
2009/0136854 A1 5/2009 Nakura
2009/0155696 A1 6/2009 Lee
2009/0155697 A1 6/2009 Park
2009/0169463 A1 7/2009 Smalley

(56) References Cited

U.S. PATENT DOCUMENTS

| | | | |
|---|---|---|---|
| 2009/0181296 | A1 | 7/2009 | Lampe-Onnerud |
| 2009/0186077 | A1 | 7/2009 | Ying |
| 2009/0186267 | A1 | 7/2009 | Tiegs |
| 2009/0191464 | A1 | 7/2009 | Ryu |
| 2009/0208835 | A1 | 8/2009 | Horiuchi |
| 2009/0246625 | A1 | 10/2009 | Lu |
| 2009/0246628 | A1 | 10/2009 | Adachi |
| 2009/0253035 | A1 | 10/2009 | Otsuki |
| 2009/0253046 | A1 | 10/2009 | Smart |
| 2009/0256528 | A1 | 10/2009 | Greening |
| 2009/0258924 | A1 | 10/2009 | Lyons |
| 2009/0259420 | A1 | 10/2009 | Greening |
| 2009/0269654 | A1 | 10/2009 | Kairawicz |
| 2009/0269673 | A1 | 10/2009 | Ignatyev |
| 2009/0280400 | A1 | 11/2009 | Tsukamoto |
| 2009/0291330 | A1 | 11/2009 | Onnerud |
| 2009/0297937 | A1 | 12/2009 | Lampe-Onnerud |
| 2009/0305016 | A1 | 12/2009 | Miyoshi |
| 2009/0311587 | A1 | 12/2009 | Best |
| 2010/0009260 | A1 | 1/2010 | Tanaka |
| 2010/0015521 | A1 | 1/2010 | Kim |
| 2010/0018034 | A1 | 1/2010 | Miyasaka |
| 2010/0047695 | A1 | 2/2010 | Smart |
| 2010/0062345 | A1 | 3/2010 | Horikawa |
| 2010/0068461 | A1 | 3/2010 | Wallace |
| 2010/0068605 | A1 | 3/2010 | Harris |
| 2010/0075222 | A1 | 3/2010 | Watanabe |
| 2010/0075225 | A1 | 3/2010 | Wilkins |
| 2010/0078599 | A1 | 4/2010 | Kumta |
| 2010/0086823 | A1 | 4/2010 | Koshino |
| 2010/0090650 | A1 | 4/2010 | Yazami |
| 2010/0094042 | A1 | 4/2010 | Klaehn |
| 2010/0112062 | A1 | 5/2010 | Atala |
| 2010/0119881 | A1 | 5/2010 | Patel |
| 2010/0119956 | A1 | 5/2010 | Tokuda |
| 2010/0124691 | A1 | 5/2010 | Harris |
| 2010/0125082 | A1 | 5/2010 | Holenz |
| 2010/0125087 | A1 | 5/2010 | Holenz |
| 2010/0136410 | A1 | 6/2010 | Kawasoe |
| 2010/0143770 | A1 | 6/2010 | Onnerud |
| 2010/0159346 | A1 | 6/2010 | Hinago |
| 2010/0164436 | A1 | 7/2010 | Lampe-Onnerud |
| 2010/0167121 | A1 | 7/2010 | Arai |
| 2010/0173139 | A1 | 7/2010 | Miyoshi |
| 2010/0178555 | A1 | 7/2010 | Best |
| 2010/0183917 | A1 | 7/2010 | Holzapfel |
| 2010/0190059 | A1 | 7/2010 | Graetz |
| 2010/0200403 | A1 | 8/2010 | Lopatin |
| 2010/0204325 | A1 | 8/2010 | Blanda |
| 2010/0209782 | A1 | 8/2010 | Choi |
| 2010/0215708 | A1 | 8/2010 | Zumbuehl |
| 2010/0216016 | A1 | 8/2010 | Seino |
| 2010/0216027 | A1 | 8/2010 | Fujii |
| 2010/0224824 | A1 | 9/2010 | Gorshkov |
| 2010/0226963 | A1 | 9/2010 | Cooper |
| 2010/0233523 | A1 | 9/2010 | Jo |
| 2010/0240813 | A1 | 9/2010 | Terada |
| 2010/0255356 | A1 | 10/2010 | Fujii |
| 2010/0278897 | A1 | 11/2010 | Shi |
| 2010/0279155 | A1 | 11/2010 | Scott |
| 2010/0285352 | A1 | 11/2010 | Juzkow |
| 2010/0285354 | A1 | 11/2010 | Su |
| 2010/0285358 | A1 | 11/2010 | Cui |
| 2010/0285373 | A1 | 11/2010 | Horikawa |
| 2010/0297502 | A1 | 11/2010 | Zhu |
| 2010/0299008 | A1 | 11/2010 | Mitsutani |
| 2010/0304205 | A1 | 12/2010 | Jo |
| 2010/0304223 | A1 | 12/2010 | Otsuki |
| 2010/0310941 | A1 | 12/2010 | Kumta |
| 2010/0311808 | A1 | 12/2010 | Lyons |
| 2010/0323238 | A1 | 12/2010 | Takahashi |
| 2010/0330410 | A1 | 12/2010 | Takahashi |
| 2010/0330419 | A1 | 12/2010 | Cui |
| 2010/0330421 | A1 | 12/2010 | Cui |
| 2010/0330423 | A1 | 12/2010 | Cui |
| 2010/0330425 | A1 | 12/2010 | Lopatin |
| 2011/0014527 | A1 | 1/2011 | Ohlsen |
| 2011/0020704 | A1 | 1/2011 | Fukuchi |
| 2011/0020706 | A1 | 1/2011 | Nesper |
| 2011/0024396 | A1 | 2/2011 | Onnerud |
| 2011/0027656 | A1 | 2/2011 | Chiang |
| 2011/0033540 | A1 | 2/2011 | Daniloff |
| 2011/0033734 | A1 | 2/2011 | Chamberlain, II |
| 2011/0033756 | A1 | 2/2011 | Nakura |
| 2011/0034448 | A1 | 2/2011 | Chang |
| 2011/0039157 | A1 | 2/2011 | Sasaki |
| 2011/0049745 | A1 | 3/2011 | Katayama |
| 2011/0052966 | A1 | 3/2011 | Lampe-Onnerud |
| 2011/0059349 | A1 | 3/2011 | Lampe-Onnerud |
| 2011/0067230 | A1 | 3/2011 | Tan |
| 2011/0070495 | A1 | 3/2011 | Ban |
| 2011/0070504 | A1 | 3/2011 | Matsumoto |
| 2011/0077880 | A1 | 3/2011 | Gering |
| 2011/0081563 | A1 | 4/2011 | Christensen |
| 2011/0081581 | A1 | 4/2011 | Ryu |
| 2011/0086781 | A1 | 4/2011 | Smalley |
| 2011/0097379 | A1 | 4/2011 | Yoo |
| 2011/0097628 | A1 | 4/2011 | Lopatin |
| 2011/0097630 | A1 | 4/2011 | Choi |
| 2011/0098463 | A1 | 4/2011 | Yoshitani |
| 2011/0104553 | A1 | 5/2011 | Pol |
| 2011/0104565 | A1 | 5/2011 | Utsumi |
| 2011/0111294 | A1 | 5/2011 | Lopez |
| 2011/0111304 | A1 | 5/2011 | Cui |
| 2011/0117407 | A1 | 5/2011 | Huang |
| 2011/0117445 | A1 | 5/2011 | Abraham |
| 2011/0117446 | A1 | 5/2011 | Lucht |
| 2011/0123869 | A1 | 5/2011 | Choi |
| 2011/0136019 | A1 | 6/2011 | Amiruddin |
| 2011/0143201 | A1 | 6/2011 | Takada |
| 2011/0143219 | A1 | 6/2011 | Weiss |
| 2011/0159329 | A1 | 6/2011 | Tsujikawa |
| 2011/0159365 | A1 | 6/2011 | Loveness |
| 2011/0159377 | A1 | 6/2011 | Lee |
| 2011/0159379 | A1 | 6/2011 | Matsumoto |
| 2011/0171502 | A1 | 7/2011 | Kottenstette |
| 2011/0177393 | A1 | 7/2011 | Park |
| 2011/0181249 | A1 | 7/2011 | Deguchi |
| 2011/0183216 | A1 | 7/2011 | Kim |
| 2011/0189512 | A1 | 8/2011 | Onnerud |
| 2011/0189520 | A1 | 8/2011 | Carter |
| 2011/0189548 | A1 | 8/2011 | Xu |
| 2011/0189579 | A1 | 8/2011 | Bismarck |
| 2011/0195318 | A1 | 8/2011 | Tsujikawa |
| 2011/0200874 | A1 | 8/2011 | Ono |
| 2011/0206979 | A1 | 8/2011 | Giroud |
| 2011/0206994 | A1 | 8/2011 | Balsara |
| 2011/0207000 | A1 | 8/2011 | Jow |
| 2011/0229761 | A1 | 9/2011 | Cui |
| 2011/0236751 | A1 | 9/2011 | Amiruddin |
| 2011/0236765 | A1 | 9/2011 | Matsui |
| 2011/0250503 | A1 | 10/2011 | Wilson |
| 2011/0256457 | A1 | 10/2011 | Utsumi |
| 2011/0264381 | A1 | 10/2011 | Gering |
| 2011/0274977 | A1 | 11/2011 | Nakura |
| 2011/0287316 | A1 | 11/2011 | Lu |
| 2011/0287318 | A1 | 11/2011 | Loveness |
| 2011/0293997 | A1 | 12/2011 | Tartaglia |
| 2011/0301931 | A1 | 12/2011 | Gering |
| 2011/0305949 | A1 | 12/2011 | Nesper |
| 2011/0305958 | A1 | 12/2011 | Kuriki |
| 2011/0319426 | A1 | 12/2011 | Holenz |
| 2012/0003514 | A1 | 1/2012 | Tsujikawa |
| 2012/0003518 | A1 | 1/2012 | Fischel |
| 2012/0007560 | A1 | 1/2012 | Smart |
| 2012/0015249 | A1 | 1/2012 | Awano |
| 2012/0021286 | A1 | 1/2012 | Tabuchi |
| 2012/0028105 | A1 | 2/2012 | Kumar |
| 2012/0034512 | A1 | 2/2012 | Zhang |
| 2012/0045670 | A1 | 2/2012 | Stefan |
| 2012/0052401 | A1 | 3/2012 | Goodenough |
| 2012/0058377 | A1 | 3/2012 | Sastry |
| 2012/0060360 | A1 | 3/2012 | Liu |
| 2012/0064396 | A1 | 3/2012 | Nishie |

(56) References Cited

U.S. PATENT DOCUMENTS

| | | | |
|---|---|---|---|
| 2012/0070741 A1 | 3/2012 | Liu | |
| 2012/0077076 A1 | 3/2012 | Cheng | |
| 2012/0077082 A1 | 3/2012 | Se-Hee | |
| 2012/0077095 A1 | 3/2012 | Roumi | |
| 2012/0082873 A1 | 4/2012 | Fischel | |
| 2012/0082890 A1 | 4/2012 | Dong | |
| 2012/0082902 A1 | 4/2012 | Hwu | |
| 2012/0082903 A1 | 4/2012 | Zhang | |
| 2012/0088155 A1 | 4/2012 | Yushin | |
| 2012/0088162 A1* | 4/2012 | Harrup | H01B 1/122 429/339 |
| 2012/0094178 A1 | 4/2012 | Loveridge | |
| 2012/0100438 A1 | 4/2012 | Fasching | |
| 2012/0105007 A1 | 5/2012 | Amiruddin | |
| 2012/0107680 A1 | 5/2012 | Amiruddin | |
| 2012/0107697 A1 | 5/2012 | Roh | |
| 2012/0107726 A1 | 5/2012 | Ogata | |
| 2012/0115018 A1 | 5/2012 | Kawaoka | |
| 2012/0121974 A1 | 5/2012 | Tikhonov | |
| 2012/0121989 A1 | 5/2012 | Roberts | |
| 2012/0121991 A1 | 5/2012 | Tikhonov | |
| 2012/0129019 A1 | 5/2012 | Onnerud | |
| 2012/0129046 A1 | 5/2012 | Utsumi | |
| 2012/0133341 A1 | 5/2012 | Gan | |
| 2012/0135312 A1 | 5/2012 | Takahashi | |
| 2012/0141864 A1 | 6/2012 | Juzkow | |
| 2012/0141866 A1 | 6/2012 | Kuriki | |
| 2012/0141867 A1 | 6/2012 | Iwayasu | |
| 2012/0141869 A1 | 6/2012 | Takahata | |
| 2012/0141878 A1 | 6/2012 | Ohashi | |
| 2012/0141883 A1 | 6/2012 | Smart | |
| 2012/0141884 A1 | 6/2012 | Takahata | |
| 2012/0148922 A1 | 6/2012 | Takahashi | |
| 2012/0155507 A1 | 6/2012 | Srinivasan | |
| 2012/0164519 A1 | 6/2012 | Lee | |
| 2012/0164541 A1 | 6/2012 | Darolles | |
| 2012/0164699 A1 | 6/2012 | Anderson | |
| 2012/0169297 A1 | 7/2012 | Schaefer | |
| 2012/0171536 A1 | 7/2012 | Kaneda | |
| 2012/0171542 A1 | 7/2012 | Matsumoto | |
| 2012/0175552 A1 | 7/2012 | Fukuchi | |
| 2012/0177995 A1 | 7/2012 | Sun | |
| 2012/0183842 A1 | 7/2012 | Kawasaki | |
| 2012/0183843 A1 | 7/2012 | Kawasaki | |
| 2012/0183856 A1 | 7/2012 | Cui | |
| 2012/0183865 A1 | 7/2012 | Deguchi | |
| 2012/0183866 A1 | 7/2012 | Lee | |
| 2012/0188086 A1 | 7/2012 | Xie | |
| 2012/0189920 A1 | 7/2012 | Li | |
| 2012/0202112 A1 | 8/2012 | Yushin | |
| 2012/0208087 A1 | 8/2012 | Yamamoto | |
| 2012/0218683 A1 | 8/2012 | Kondou | |
| 2012/0219865 A1 | 8/2012 | Kaneko | |
| 2012/0225331 A1 | 9/2012 | Tartaglia | |
| 2012/0225358 A1 | 9/2012 | Seo | |
| 2012/0225359 A1 | 9/2012 | Xu | |
| 2012/0231308 A1 | 9/2012 | Chiang | |
| 2012/0231325 A1 | 9/2012 | Yoon | |
| 2012/0231352 A1 | 9/2012 | Pol | |
| 2012/0241491 A1 | 9/2012 | Aldridge | |
| 2012/0241492 A1 | 9/2012 | Shelton, IV | |
| 2012/0241496 A1 | 9/2012 | Mandakolathur Vasudevan | |
| 2012/0241502 A1 | 9/2012 | Aldridge | |
| 2012/0244391 A1 | 9/2012 | Yushin | |
| 2012/0244417 A1 | 9/2012 | Takahata | |
| 2012/0245505 A1 | 9/2012 | Robinson | |
| 2012/0251886 A1 | 10/2012 | Yushin | |
| 2012/0251892 A1 | 10/2012 | Kang | |
| 2012/0253298 A1 | 10/2012 | Henderson | |
| 2012/0273737 A1 | 11/2012 | Ooishi | |
| 2012/0276445 A1 | 11/2012 | Xu | |
| 2012/0288750 A1 | 11/2012 | Kung | |
| 2012/0288751 A1 | 11/2012 | Kako | |
| 2012/0288769 A1 | 11/2012 | Kono | |
| 2012/0289887 A1 | 11/2012 | Visco | |
| 2012/0293916 A1 | 11/2012 | Lee | |
| 2012/0295155 A1 | 11/2012 | Deng | |
| 2012/0295165 A1 | 11/2012 | Morin | |
| 2012/0301789 A1 | 11/2012 | Loveness | |
| 2012/0301797 A1 | 11/2012 | Abe | |
| 2012/0308894 A1 | 12/2012 | Oguni | |
| 2012/0315535 A1 | 12/2012 | Matsumoto | |
| 2012/0315549 A1 | 12/2012 | Tang | |
| 2012/0321959 A1 | 12/2012 | Yushin | |
| 2012/0328942 A1 | 12/2012 | Thomas-Alyea | |
| 2012/0328952 A1 | 12/2012 | Yushin | |
| 2013/0004839 A1 | 1/2013 | Utsumi | |
| 2013/0004862 A1 | 1/2013 | Miyoshi | |
| 2013/0011728 A1 | 1/2013 | Tokuda | |
| 2013/0011736 A1 | 1/2013 | Loveness | |
| 2013/0017443 A1 | 1/2013 | Yamazaki | |
| 2013/0017453 A1 | 1/2013 | Ajayan | |
| 2013/0022863 A1 | 1/2013 | Madabusi | |
| 2013/0022880 A1 | 1/2013 | Tsujioka | |
| 2013/0026409 A1 | 1/2013 | Baker | |
| 2013/0040203 A1 | 2/2013 | Yoon | |
| 2013/0043843 A1 | 2/2013 | Amiruddin | |
| 2013/0048923 A1 | 2/2013 | Gorshkov | |
| 2013/0052528 A1 | 2/2013 | Kuriki | |
| 2013/0052542 A1 | 2/2013 | Abraham | |
| 2013/0055559 A1 | 3/2013 | Slocum | |
| 2013/0059172 A1 | 3/2013 | Sastry | |
| 2013/0065122 A1 | 3/2013 | Chiang | |
| 2013/0065130 A1 | 3/2013 | Ban | |
| 2013/0069601 A1 | 3/2013 | Coowar | |
| 2013/0069658 A1 | 3/2013 | Rich | |
| 2013/0069661 A1 | 3/2013 | Rich | |
| 2013/0071733 A1 | 3/2013 | Abe | |
| 2013/0071739 A1 | 3/2013 | Tajima | |
| 2013/0071762 A1 | 3/2013 | Tajima | |
| 2013/0072154 A1 | 3/2013 | Rich | |
| 2013/0078525 A1 | 3/2013 | Morin | |
| 2013/0084495 A1 | 4/2013 | Tajima | |
| 2013/0084496 A1 | 4/2013 | Osada | |
| 2013/0084501 A1 | 4/2013 | Wakayama | |
| 2013/0088204 A1 | 4/2013 | Khare | |
| 2013/0089793 A1 | 4/2013 | Gering | |
| 2013/0090900 A1 | 4/2013 | Gering | |
| 2013/0092866 A1 | 4/2013 | Rupert | |
| 2013/0095351 A1 | 4/2013 | Gellett | |
| 2013/0095392 A1 | 4/2013 | Shin | |
| 2013/0100563 A1 | 4/2013 | Cho | |
| 2013/0108899 A1 | 5/2013 | Schaefer | |
| 2013/0108930 A1 | 5/2013 | Patterson | |
| 2013/0115520 A1 | 5/2013 | Abe | |
| 2013/0115529 A1 | 5/2013 | Zhang | |
| 2013/0130069 A1 | 5/2013 | Mullin | |
| 2013/0130121 A1 | 5/2013 | Abe | |
| 2013/0130128 A1 | 5/2013 | Okamoto | |
| 2013/0135110 A1 | 5/2013 | Xie | |
| 2013/0136981 A1 | 5/2013 | Peuchert | |
| 2013/0143090 A1 | 6/2013 | Hosoya | |
| 2013/0143129 A1 | 6/2013 | Okamoto | |
| 2013/0149567 A1 | 6/2013 | Schaefer | |
| 2013/0149602 A1 | 6/2013 | Luski | |
| 2013/0149605 A1 | 6/2013 | Kakehata | |
| 2013/0149670 A1 | 6/2013 | Francois | |
| 2013/0157147 A1 | 6/2013 | Li | |
| 2013/0157149 A1 | 6/2013 | Peled | |
| 2013/0157152 A1 | 6/2013 | Lanning | |
| 2013/0163148 A1 | 6/2013 | Isii | |
| 2013/0164611 A1 | 6/2013 | Nanba | |
| 2013/0164612 A1 | 6/2013 | Tanemura | |
| 2013/0169238 A1 | 7/2013 | Rojeski | |
| 2013/0171340 A1 | 7/2013 | Rojeski | |
| 2013/0171502 A1 | 7/2013 | Chen | |
| 2013/0171512 A1 | 7/2013 | Rojeski | |
| 2013/0177814 A1 | 7/2013 | Rojeski | |
| 2013/0183579 A1 | 7/2013 | Kim | |
| 2013/0183580 A1 | 7/2013 | Kako | |
| 2013/0189575 A1 | 7/2013 | Anguchamy | |
| 2013/0189579 A1 | 7/2013 | Darby | |
| 2013/0189592 A1 | 7/2013 | Roumi | |
| 2013/0195805 A1 | 8/2013 | Wei | |

(56) References Cited

U.S. PATENT DOCUMENTS

2013/0195841 A1 8/2013 Gabbay
2013/0196223 A1 8/2013 Gering
2013/0196235 A1 8/2013 Prieto
2013/0199936 A1 8/2013 Zhang
2013/0202920 A1 8/2013 Xu
2013/0202955 A1 8/2013 Yawata
2013/0202956 A1 8/2013 Xu
2013/0202959 A1 8/2013 Chiang
2013/0202967 A1 8/2013 Kim
2013/0202973 A1 8/2013 Lane
2013/0209860 A1 8/2013 Tsujikawa
2013/0209869 A1 8/2013 Rojeski
2013/0209870 A1 8/2013 Tsujikawa
2013/0209887 A1 8/2013 Young
2013/0209897 A1 8/2013 Paranthaman
2013/0216899 A1 8/2013 Tsujikawa
2013/0216907 A1 8/2013 Rayner
2013/0216908 A1 8/2013 Tsujikawa
2013/0216918 A1 8/2013 Tokuda
2013/0216920 A1 8/2013 Tsujikawa
2013/0224576 A1 8/2013 Rosciano
2013/0224583 A1 8/2013 Green
2013/0230772 A1 9/2013 Noda
2013/0230773 A1 9/2013 Tsujikawa
2013/0230779 A1 9/2013 Kaneko
2013/0232772 A1 9/2013 Tikhonov
2013/0234074 A1 9/2013 Gilles
2013/0236750 A1 9/2013 Sato
2013/0236766 A1 9/2013 Seo
2013/0244102 A1 9/2013 Golodnitsky
2013/0244107 A1 9/2013 Rojeski
2013/0252090 A1 9/2013 Tsujikawa
2013/0252101 A1 9/2013 Zhou
2013/0256375 A1 10/2013 Shelton, IV
2013/0256376 A1 10/2013 Barton
2013/0259776 A1 10/2013 Heres
2013/0260222 A1 10/2013 Lu
2013/0260229 A1 10/2013 Uzun
2013/0260232 A1 10/2013 Lu
2013/0260254 A1 10/2013 Kren
2013/0260255 A1 10/2013 Lopatin
2013/0264999 A1 10/2013 Srinivasan
2013/0266827 A1 10/2013 Sastry
2013/0266846 A1 10/2013 Kawasaki
2013/0266858 A1 10/2013 Inoue
2013/0266866 A1 10/2013 Miyazaki
2013/0271089 A1 10/2013 Yazami
2013/0277599 A1 10/2013 Michot
2013/0280592 A1 10/2013 Sato
2013/0280621 A1 10/2013 Koga
2013/0288084 A1 10/2013 Sastry
2013/0288113 A1 10/2013 Onagi
2013/0288120 A1 10/2013 Iida
2013/0288138 A1 10/2013 Tikhonov
2013/0295439 A1 11/2013 Masarapu
2013/0295461 A1 11/2013 Chen
2013/0295465 A1 11/2013 Kaneko
2013/0295492 A1 11/2013 Hinago
2013/0302650 A1 11/2013 DeLangis
2013/0302679 A1 11/2013 Uemachi
2013/0302697 A1 11/2013 Wang
2013/0302702 A1 11/2013 Matsumoto
2013/0309527 A1 11/2013 Liu
2013/0309549 A1 11/2013 Luski
2013/0309564 A1 11/2013 Yoshida
2013/0309571 A1 11/2013 Yoon
2013/0316248 A9 11/2013 Ignatyev
2013/0319870 A1 12/2013 Chen
2013/0320582 A1 12/2013 Cui
2013/0323585 A1 12/2013 Inoue
2013/0323595 A1 12/2013 Sohn
2013/0323605 A1 12/2013 Yamamoto
2013/0327648 A1 12/2013 Grant
2013/0330609 A1 12/2013 Sawa
2013/0330637 A1 12/2013 Matsumoto
2013/0337304 A1 12/2013 Luski
2013/0337335 A1 12/2013 Kim
2013/0337338 A1 12/2013 Tikhonov
2013/0337339 A1 12/2013 Tikhonov
2013/0337340 A1 12/2013 Tikhonov
2013/0337341 A1 12/2013 Tikhonov
2013/0337343 A1 12/2013 Tokuda
2013/0337346 A1 12/2013 Miyoshi
2013/0344360 A1 12/2013 Miyajama
2013/0344383 A1 12/2013 Loveness
2013/0344391 A1 12/2013 Yushin
2013/0344392 A1 12/2013 Huang
2014/0011081 A1 1/2014 Ahn
2014/0011088 A1 1/2014 Lopatin
2014/0015160 A1 1/2014 Kung
2014/0017549 A1 1/2014 Miyazaki
2014/0017559 A1 1/2014 Kawasaki
2014/0017568 A1 1/2014 Gadkaree
2014/0017573 A1 1/2014 Otsuki
2014/0023932 A1 1/2014 Zhang
2014/0023934 A1 1/2014 Otsuki
2014/0030609 A1 1/2014 Abe
2014/0030610 A1 1/2014 Abe
2014/0030623 A1 1/2014 Chiang
2014/0038059 A1 2/2014 Li
2014/0038060 A1 2/2014 Abe
2014/0045015 A1 2/2014 Yokoyama
2014/0045016 A1 2/2014 Okutani
2014/0045017 A1 2/2014 Nonaka
2014/0045019 A1 2/2014 Yokoyama
2014/0045020 A1 2/2014 Okutani
2014/0045021 A1 2/2014 Okutani
2014/0045022 A1 2/2014 Matsuda
2014/0045065 A1 2/2014 Bao
2014/0050910 A1 2/2014 Mukherjee
2014/0050972 A1 2/2014 Amiruddin
2014/0057168 A1 2/2014 Newbound
2014/0057169 A1 2/2014 George
2014/0057172 A1 2/2014 Jeong
2014/0057173 A1 2/2014 Jeong
2014/0057179 A1 2/2014 Yushin
2014/0065479 A1 3/2014 Yamada
2014/0072837 A1 3/2014 Sastry
2014/0072843 A1 3/2014 Liemersdorf
2014/0072877 A1 3/2014 Araki
2014/0087214 A1 3/2014 Amatucci
2014/0087250 A1 3/2014 Coowar
2014/0087251 A1 3/2014 Takahashi
2014/0087257 A1 3/2014 Gopukumar
2014/0093780 A1 4/2014 Tabuchi
2014/0093787 A1 4/2014 Abe
2014/0099560 A1 4/2014 Parans Paranthaman
2014/0106219 A1 4/2014 Wang
2014/0107326 A1 4/2014 Swager
2014/0113202 A1 4/2014 Sun
2014/0113203 A1 4/2014 Xiao
2014/0117940 A1 5/2014 Takahata
2014/0125292 A1 5/2014 Best
2014/0127567 A1 5/2014 Kuriki
2014/0127575 A1 5/2014 Scrosati
2014/0132220 A1 5/2014 Jamison
2014/0134499 A1 5/2014 Newbound
2014/0134501 A1 5/2014 Li
2014/0134521 A1 5/2014 Naito
2014/0138591 A1 5/2014 Yoon
2014/0140912 A1 5/2014 Ivanovic-Burmazovic
2014/0141336 A1 5/2014 Morin
2014/0141337 A1 5/2014 Morin
2014/0141340 A1 5/2014 Egorov
2014/0147741 A1 5/2014 Shin
2014/0147752 A1 5/2014 Pratt
2014/0154546 A1 6/2014 Carter
2014/0154557 A1 6/2014 Mori
2014/0154559 A1 6/2014 Mori
2014/0154587 A1 6/2014 Abe
2014/0154590 A1 6/2014 Kramer
2014/0162130 A1 6/2014 Barsoum
2014/0162131 A1 6/2014 Friend
2014/0166929 A1 6/2014 Takeuchi

(56) References Cited

U.S. PATENT DOCUMENTS

| | | | |
|---|---|---|---|
| 2014/0166939 | A1 | 6/2014 | Park |
| 2014/0170303 | A1 | 6/2014 | Rayner |
| 2014/0170475 | A1 | 6/2014 | Park |
| 2014/0170482 | A1 | 6/2014 | Park |
| 2014/0170498 | A1 | 6/2014 | Park |
| 2014/0170503 | A1 | 6/2014 | Yushin |
| 2014/0170524 | A1 | 6/2014 | Chiang |
| 2014/0173300 | A1 | 6/2014 | Yamazaki |
| 2014/0176074 | A1 | 6/2014 | Kako |
| 2014/0176076 | A1 | 6/2014 | Momo |
| 2014/0178759 | A1 | 6/2014 | Worsley |
| 2014/0178770 | A1 | 6/2014 | Xu |
| 2014/0178772 | A1 | 6/2014 | Jeong |
| 2014/0184162 | A1 | 7/2014 | Takahashi |
| 2014/0184172 | A1 | 7/2014 | Momo |
| 2014/0193712 | A1 | 7/2014 | Yushin |
| 2014/0197801 | A1 | 7/2014 | Nuzzo |
| 2014/0197805 | A1 | 7/2014 | Greening |
| 2014/0199585 | A1 | 7/2014 | Rupert |
| 2014/0199599 | A1 | 7/2014 | Yu |
| 2014/0199600 | A1 | 7/2014 | Yawata |
| 2014/0205637 | A1 | 7/2014 | Widenhouse |
| 2014/0205905 | A1 | 7/2014 | Xiao |
| 2014/0212752 | A1 | 7/2014 | Arakawa |
| 2014/0212763 | A1 | 7/2014 | Tzeng |
| 2014/0212770 | A1 | 7/2014 | Abe |
| 2014/0220417 | A1 | 8/2014 | Cheng |
| 2014/0220422 | A1 | 8/2014 | Rogers |
| 2014/0224857 | A1 | 8/2014 | Schmid |
| 2014/0227432 | A1 | 8/2014 | Liu |
| 2014/0230887 | A1 | 8/2014 | Eguchi |
| 2014/0234693 | A1 | 8/2014 | Tsujikawa |
| 2014/0234705 | A1 | 8/2014 | Yayamoto |
| 2014/0234711 | A1 | 8/2014 | Rojeski |
| 2014/0234712 | A1 | 8/2014 | Rojeski |
| 2014/0234713 | A1 | 8/2014 | Rojeski |
| 2014/0234727 | A1 | 8/2014 | Abe |
| 2014/0234732 | A1 | 8/2014 | Park |
| 2014/0242445 | A1 | 8/2014 | Gozdz |
| 2014/0242453 | A1 | 8/2014 | Lee |
| 2014/0242469 | A1 | 8/2014 | Yamamoto |
| 2014/0242474 | A1 | 8/2014 | Matsui |
| 2014/0248521 | A1 | 9/2014 | Chiang |
| 2014/0248537 | A1 | 9/2014 | Hayashi |
| 2014/0264198 | A1 | 9/2014 | Tong |
| 2014/0266055 | A1 | 9/2014 | Trimble |
| 2014/0266056 | A1 | 9/2014 | Trimble |
| 2014/0266075 | A1 | 9/2014 | Gellett |
| 2014/0272132 | A1 | 9/2014 | Frianeza-Kullberg |
| 2014/0272489 | A1 | 9/2014 | Anandan |
| 2014/0272531 | A1 | 9/2014 | Manning |
| 2014/0272553 | A1 | 9/2014 | Cheng |
| 2014/0272558 | A1 | 9/2014 | Xiao |
| 2014/0272567 | A1 | 9/2014 | Zhang |
| 2014/0272568 | A1 | 9/2014 | Frianeza-Kullberg |
| 2014/0272574 | A1 | 9/2014 | Son |
| 2014/0272576 | A1 | 9/2014 | Kamat |
| 2014/0272577 | A1 | 9/2014 | Hartner |
| 2014/0272578 | A1 | 9/2014 | Xiao |
| 2014/0272579 | A1 | 9/2014 | Frianeza-Kullberg |
| 2014/0272580 | A1 | 9/2014 | Frianeza-Kullburg |
| 2014/0272583 | A1 | 9/2014 | Hellring |
| 2014/0272591 | A1 | 9/2014 | Vanier |
| 2014/0287305 | A1 | 9/2014 | Wachsman |
| 2014/0287325 | A1 | 9/2014 | Abe |
| 2014/0287330 | A1 | 9/2014 | Ohlsen |
| 2014/0294986 | A1 | 10/2014 | Liu |
| 2014/0295268 | A1 | 10/2014 | Wang |
| 2014/0295270 | A1 | 10/2014 | Adachi |
| 2014/0295290 | A1 | 10/2014 | Park |
| 2014/0302354 | A1 | 10/2014 | Shao |
| 2014/0302400 | A1 | 10/2014 | Shao |
| 2014/0308562 | A1 | 10/2014 | Jeong |
| 2014/0308583 | A1 | 10/2014 | Manthiram |
| 2014/0308585 | A1 | 10/2014 | Han |
| 2014/0308588 | A1 | 10/2014 | Hirakawa |
| 2014/0310951 | A1 | 10/2014 | Grant |
| 2014/0312269 | A1 | 10/2014 | Laumann |
| 2014/0314948 | A1 | 10/2014 | Braun |
| 2014/0315072 | A1 | 10/2014 | Kobayashi |
| 2014/0315097 | A1 | 10/2014 | Tan |
| 2014/0322579 | A1 | 10/2014 | Mitsuhashi |
| 2014/0322602 | A1 | 10/2014 | Yamazaki |
| 2014/0329120 | A1 | 11/2014 | Cui |
| 2014/0329131 | A1 | 11/2014 | Jo |
| 2014/0329150 | A1 | 11/2014 | de Guzman |
| 2014/0335406 | A1 | 11/2014 | An |
| 2014/0335410 | A1 | 11/2014 | Loveridge |
| 2014/0335411 | A1 | 11/2014 | Liu |
| 2014/0342200 | A1 | 11/2014 | Morita |
| 2014/0342228 | A1 | 11/2014 | Liu |
| 2014/0342240 | A1 | 11/2014 | Harrup |
| 2014/0346618 | A1 | 11/2014 | Lahlouh |
| 2014/0349182 | A1 | 11/2014 | O'Neill |
| 2014/0349186 | A1 | 11/2014 | Burton |
| 2014/0356708 | A1 | 12/2014 | Arikawa |
| 2014/0356735 | A1 | 12/2014 | Pena Hueso |
| 2014/0363735 | A1 | 12/2014 | Yoshida |
| 2014/0363746 | A1 | 12/2014 | He |
| 2014/0370380 | A9 | 12/2014 | Cui |
| 2014/0370387 | A1 | 12/2014 | Anguchamy |
| 2014/0376160 | A1 | 12/2014 | Kako |
| 2014/0377635 | A1 | 12/2014 | Matsumoto |
| 2014/0377667 | A1 | 12/2014 | Roschenthaler |
| 2014/0377668 | A1 | 12/2014 | Abe |
| 2015/0002162 | A1 | 1/2015 | Rich |
| 2015/0004444 | A1 | 1/2015 | Christensen |
| 2015/0004480 | A1 | 1/2015 | Gardner |
| 2015/0004482 | A1 | 1/2015 | Gardner |
| 2015/0004488 | A1 | 1/2015 | Abdelsalam |
| 2015/0004495 | A1 | 1/2015 | Cui |
| 2015/0010460 | A1 | 1/2015 | Takeuchi |
| 2015/0010784 | A1 | 1/2015 | Takahata |
| 2015/0017541 | A1 | 1/2015 | Tajima |
| 2015/0017543 | A1 | 1/2015 | Lee |
| 2015/0024279 | A1 | 1/2015 | Tan |
| 2015/0030856 | A1 | 1/2015 | Singh |
| 2015/0030939 | A1 | 1/2015 | Amereller |
| 2015/0037675 | A1 | 2/2015 | Izuhara |
| 2015/0037686 | A1 | 2/2015 | Peña Hueso |
| 2015/0037690 | A1 | 2/2015 | Dalavi |
| 2015/0044517 | A1 | 2/2015 | Mikhaylik |
| 2015/0044533 | A1 | 2/2015 | Tode |
| 2015/0044556 | A1 | 2/2015 | Wang |
| 2015/0044571 | A1 | 2/2015 | Abdelsalam |
| 2015/0044573 | A1 | 2/2015 | Röschenthaler |
| 2015/0045764 | A1 | 2/2015 | Kaplan |
| 2015/0050535 | A1 | 2/2015 | Amiruddin |
| 2015/0050564 | A1 | 2/2015 | Mizuno |
| 2015/0050565 | A1 | 2/2015 | Lamanna |
| 2015/0056488 | A1 | 2/2015 | Zhang |
| 2015/0056507 | A1 | 2/2015 | Dadheech |
| 2015/0056509 | A1 | 2/2015 | Jeong |
| 2015/0056514 | A1 | 2/2015 | Dai |
| 2015/0056516 | A1 | 2/2015 | Hellring |
| 2015/0062687 | A1 | 3/2015 | Milliron |
| 2015/0064568 | A1 | 3/2015 | Yushin |
| 2015/0064578 | A1 | 3/2015 | Kang |
| 2015/0064580 | A1 | 3/2015 | Bridges |
| 2015/0069307 | A1 | 3/2015 | Parans Paranthaman |
| 2015/0072225 | A1 | 3/2015 | Ishiji |
| 2015/0072232 | A1 | 3/2015 | Nagai |
| 2015/0072247 | A1 | 3/2015 | Cho |
| 2015/0079477 | A1 | 3/2015 | Spahr |
| 2015/0079483 | A1 | 3/2015 | Cresce |
| 2015/0079484 | A1 | 3/2015 | Cresce |
| 2015/0086876 | A1 | 3/2015 | Taeda |
| 2015/0086877 | A1 | 3/2015 | Yamazaki |
| 2015/0089797 | A1 | 4/2015 | Binder |
| 2015/0093631 | A1 | 4/2015 | Kawasaki |
| 2015/0093647 | A1 | 4/2015 | Kako |
| 2015/0093653 | A1 | 4/2015 | Coowar |
| 2015/0099165 | A1 | 4/2015 | Dippel |
| 2015/0099184 | A1 | 4/2015 | Rojeski |

(56) References Cited

U.S. PATENT DOCUMENTS

2015/0099185 A1 4/2015 Joo
2015/0099187 A1 4/2015 Cui
2015/0099191 A1 4/2015 Liu
2015/0099192 A1 4/2015 Yawata
2015/0102257 A1 4/2015 Mullins
2015/0104701 A1 4/2015 Azami
2015/0104712 A1 4/2015 Kerlau
2015/0104716 A1 4/2015 Kang
2015/0111078 A1 4/2015 Hosoya
2015/0111099 A1 4/2015 Zhang
2015/0118558 A1 4/2015 Yamazaki
2015/0118565 A1 4/2015 Bell
2015/0118572 A1 4/2015 Lund
2015/0125505 A1 5/2015 Wustenberg
2015/0125595 A1 5/2015 Lahlouh
2015/0125752 A1 5/2015 Nishimura
2015/0125759 A1 5/2015 Xu
2015/0125761 A1 5/2015 Shimamoto
2015/0136832 A1 5/2015 Baxter, III
2015/0137030 A1 5/2015 Matsuo
2015/0140206 A1 5/2015 O'Neill
2015/0140427 A1 5/2015 Zhang
2015/0140434 A1 5/2015 Jung
2015/0140446 A1 5/2015 Li
2015/0141484 A1 5/2015 Lyons
2015/0147397 A1 5/2015 Altschuler
2015/0147624 A1 5/2015 Yamafuku
2015/0147642 A1 5/2015 Ling
2015/0147645 A1 5/2015 Lee
2015/0147662 A1 5/2015 Park
2015/0152566 A1 6/2015 Zhang
2015/0155546 A1 6/2015 Yushin
2015/0155557 A1 6/2015 Kwon
2015/0162139 A1 6/2015 Lin
2015/0162588 A1 6/2015 Lee
2015/0162603 A1 6/2015 Yushin
2015/0171414 A1 6/2015 Takahata
2015/0171426 A1 6/2015 Wang
2015/0179976 A1 6/2015 Galand
2015/0180001 A1 6/2015 Johnson
2015/0180023 A1 6/2015 Xiao
2015/0180087 A1 6/2015 Kim
2015/0180249 A1 6/2015 Jeon
2015/0188125 A1 7/2015 Korgel
2015/0188191 A1 7/2015 Kalinovich
2015/0191841 A1 7/2015 Grant
2015/0194702 A1 7/2015 Tokunaga
2015/0200390 A1 7/2015 Lu
2015/0200422 A1 7/2015 Lee
2015/0207147 A1 7/2015 Nagai
2015/0207174 A1 7/2015 Lee
2015/0207176 A1 7/2015 Moganty
2015/0210044 A1 7/2015 Barsoum
2015/0214529 A1 7/2015 Yawata
2015/0214573 A1 7/2015 Sastry
2015/0214577 A1 7/2015 O'Neill
2015/0221936 A1 8/2015 Huang
2015/0221983 A1 8/2015 Kamiya
2015/0221987 A1 8/2015 Yawata
2015/0228980 A1 8/2015 Huang
2015/0236343 A1 8/2015 Xiao
2015/0236372 A1 8/2015 Yushin
2015/0236378 A1 8/2015 Kuwajima
2015/0236380 A1 8/2015 Garsuch
2015/0243972 A1 8/2015 Ito
2015/0243973 A1 8/2015 Newbound
2015/0243987 A1 8/2015 Lu
2015/0243988 A1 8/2015 Lu
2015/0244041 A1 8/2015 Sastry
2015/0249247 A1 9/2015 Zhou
2015/0249262 A1 9/2015 Wachsman
2015/0263342 A1 9/2015 Newbound
2015/0263379 A1 9/2015 Xiao
2015/0263543 A1 9/2015 Gellett
2015/0270552 A1 9/2015 Lee
2015/0270573 A1 9/2015 Peña Hueso
2015/0280219 A1 10/2015 Xiao
2015/0280229 A1 10/2015 Chen
2015/0280267 A1 10/2015 Chiang
2015/0288031 A1 10/2015 Zhang
2015/0295241 A1 10/2015 Liang
2015/0295275 A1 10/2015 Han
2015/0295276 A1 10/2015 Ishiji
2015/0303481 A1 10/2015 Duong
2015/0303516 A1 10/2015 Pratt
2015/0311509 A1 10/2015 Ando
2015/0311525 A1 10/2015 Masarapu
2015/0311564 A1 10/2015 Ishiji
2015/0318543 A1 11/2015 Lee
2015/0318570 A1 11/2015 Choi
2015/0318572 A1 11/2015 Kuwajima
2015/0318578 A1 11/2015 Abe
2015/0318580 A1 11/2015 Fukunaga
2015/0325843 A1 11/2015 Yoon
2015/0325852 A1 11/2015 Wang
2015/0325880 A1 11/2015 Kim
2015/0325882 A1 11/2015 Yushin
2015/0325884 A1 11/2015 Fukunaga
2015/0333310 A1 11/2015 Choi
2015/0333315 A1 11/2015 Yoon
2015/0333370 A1 11/2015 Abe
2015/0333374 A1 11/2015 Moganty
2015/0340679 A1 11/2015 Shimura
2015/0340738 A1 11/2015 Moganty
2015/0340739 A1* 11/2015 Klaehn ............ H01M 10/0525 429/339
2015/0349338 A1 12/2015 Zhao
2015/0357646 A1 12/2015 Lu
2015/0364747 A1 12/2015 Elam
2015/0364748 A1 12/2015 Amiruddin
2015/0364755 A1 12/2015 Liu
2015/0364791 A1 12/2015 Vu
2015/0364794 A1 12/2015 Nakazawa
2015/0364795 A1 12/2015 Stefan
2015/0364796 A1 12/2015 Li
2015/0372296 A1 12/2015 Jones
2015/0372305 A1 12/2015 Matsuo
2015/0372346 A1 12/2015 Sastry
2015/0372349 A1 12/2015 Shikita
2015/0373831 A1 12/2015 Rogers
2015/0377977 A1 12/2015 Yazami
2015/0380355 A1 12/2015 Rogers
2015/0380731 A1 12/2015 Tong
2015/0380772 A1 12/2015 Tokuda
2015/0380777 A1 12/2015 Takahashi
2016/0086780 A1 3/2016 Britz-McKibbin
2016/0126591 A1 5/2016 Zhang
2016/0285125 A1 9/2016 Harrup
2016/0336618 A1 11/2016 Lee
2016/0345976 A1 12/2016 González
2017/0033400 A1 2/2017 Eitouni
2017/0040638 A1 2/2017 Klaehn
2017/0170522 A1 6/2017 Moganty
2017/0199203 A1 7/2017 Britz-McKibbin
2017/0256818 A1 9/2017 Eitouni
2017/0305869 A1 10/2017 Moganty
2017/0307952 A1 10/2017 Ash
2017/0309918 A1 10/2017 Roumi
2019/0058108 A1 2/2019 Guhathakurta
2019/0134079 A1 5/2019 Cooper
2019/0269403 A1 9/2019 Baxter, III
2019/0273257 A1 9/2019 Siu
2019/0290267 A1 9/2019 Baxter, III
2019/0326579 A1 10/2019 Ryu
2020/0013945 A1 1/2020 Guhathakurta
2020/0085809 A1 3/2020 Bright
2021/0389331 A1 12/2021 Britz-McKibbin
2022/0109188 A1 4/2022 Moganty
2022/0117888 A1 4/2022 Jiang
2022/0175370 A1 6/2022 Shelton, IV
2022/0216506 A1 7/2022 Abels
2022/0246936 A1 8/2022 Jang
2022/0255129 A1 8/2022 Jang
2022/0255147 A1 8/2022 Jang

(56) References Cited

U.S. PATENT DOCUMENTS

| | | | |
|---|---|---|---|
| 2022/0271335 | A1 | 8/2022 | Jang |
| 2022/0293958 | A1 | 9/2022 | Jang |
| 2022/0302440 | A1 | 9/2022 | Jang |
| 2022/0323695 | A1 | 10/2022 | Albertini |
| 2022/0384908 | A1 | 12/2022 | Jang |
| 2022/0407183 | A1 | 12/2022 | Jang |
| 2023/0057790 | A1 | 2/2023 | Ugwu |
| 2023/0152275 | A1 | 5/2023 | Vassallo |
| 2023/0231181 | A1 | 7/2023 | Zhamu |
| 2023/0387548 | A1 | 11/2023 | Jang |
| 2024/0066180 | A1 | 2/2024 | Burnett |
| 2024/0072302 | A1 | 2/2024 | Harrup |
| 2024/0099716 | A1 | 3/2024 | Shelton, IV |
| 2024/0188956 | A1 | 6/2024 | González |
| 2024/0285782 | A1 | 8/2024 | Kleinman |
| 2024/0360576 | A1 | 10/2024 | Bocarsly |

* cited by examiner

ELECTROLYTE SOLVENT FORMULATION

CROSS REFERENCE TO RELATED APPLICATIONS

The present application is a Continuation of U.S. patent application Ser. No. 16/921,826, filed Jul. 6, 2020, now U.S. Pat. No. 11,271,248, issued Mar. 8, 2022, which is a Division of U.S. patent application Ser. No. 15/082,780, filed Mar. 28, 2016, now U.S. Pat. No. 10,707,526, issued Jul. 7, 2020, which is a non-provisional of, and claims benefit of priority under 35 U.S.C. § 119(e) from, U.S. Provisional Patent Application No. 62/139,552, filed Mar. 27, 2015, the entirety of which are expressly incorporated herein by reference in their entirety.

FIELD OF THE INVENTION

The present invention relates to a solvent system comprising a mixture of primary solvent phosphoranimine (PA) derivatives, and co-solvents comprised of cyclotriphosphazene (Pz) derivatives optionally with monomeric phosphorus (MP) compound additives, for the potentially complete replacement of organic solvents in an electrolyte formulation. A preferred application is in lithium-ion batteries.

BACKGROUND OF THE INVENTION

Batteries with high activity metals, i.e., cell potentials above about 1.5 V, are subject to hydrolysis of aqueous electrolytes. Therefore, rechargeable high energy batteries typically employ non-aqueous electrolytes which lack free hydroxyl substituents. Other criteria for suitable electrolytes are solubility for a supporting salt which yields a charge carrier ion in sufficient concentration to permit high current density, while avoiding strongly bound complexes of the charge carrier ion with the solvent, and a sufficiently low viscosity to permit efficient charge carrier transport through the electrolyte. Further, the battery typically has a storage temperature range of 0° C. or below to 60° C. or above, and the electrolyte should be reasonably stable as a liquid within that range. Finally, the electrolyte should be chemically inert with respect to the battery chemistry, with the exception of the formation of a stable solid electrolyte interphase (SEI) layer near the reactive surface of the electrode, which permits flow of the charge carrier ions between the bulk electrolyte solution and the electrode surfaces, while protecting the bulk electrolyte solution from large-scale decomposition by the electrochemical reactions that during cycling. The SEI should be dynamic, and reform as required under normal battery cycling conditions from the bulk electrolyte solution.

Lithium-ion batteries have been in widespread use for decades. These energy storage systems have been investigated for a wide variety of applications, from small single cell platforms, such as watches, phones and the like; to larger format platforms such as those applicable for transportation systems and potentially grid-scale energy storage. A considerable limitation of lithium-ion batteries containing lithium salts in organic solvents, such as ethylene carbonate and ethyl methyl carbonate, is the potential for the ignition of the flammable electrolyte solution under certain operating conditions. Also notable is the degradation of the solvent and the formation of the SEI under current draw that can raise the temperature and hence the internal pressure generated causing the battery cell to rupture. Multiple approaches to effect the replacement of organic solvents from battery electrolytes have been investigated over the past 20+ years. Some have limiting requirements that make them impractical for wide-scale adoption for common multi-cell applications, such as thermal requirements (molten salts) and complex engineering designs (flow batteries). There is a pressing need for a complete replacement of current organic electrolyte systems without these constraints. One area that has shown promise of fulfilling these stringent requirements is through the use of phosphorus-based inorganic compounds. The present invention leverages compounds of this nature to achieve the goal of eliminating all organic components from the electrolyte system for a wide variety of lithium-ion-based energy storage platforms.

Most of the commercial electrolytes for lithium-ion batteries are $LiPF_6$ dissolved in a mixture of organic carbonate and/or ester solvents. These electrolyte blends are highly volatile and highly flammable, with typical flash points as low as 30° C. or less. This presents serious safety concerns especially when utilized in large format cells or when the cells come under undo stress or physical damage. One approach to improve the safety performance of the electrolyte is to use additives and co-solvents to reduce the flammability of the organic carbonate and ester electrolytes. A variety of additives and co-solvents have been proposed, including sulfones, ionic liquids, phosphates, phospholanes, Pzs, siloxanes, fluorinated carbonates, and fluorinated ethers and mixtures thereof. In addition to flammability suppression, additives have also been used to improve SEI formation, overcharge protection, and thermal stability.

Electrolyte solutions used in lithium-ion batteries are known to be unstable at high temperatures and high voltages. Over time, the organic electrolyte solution turns into a tar-like material at high temperatures. The electrolyte solutions may include carbonate-based solvents, such as dimethyl carbonate (DMC), ethylene carbonate (EC), ethylmethyl carbonate (EMC), etc. However, the carbonate-based solvents are problematic due to their high volatility, flammability, and decomposition at even modestly elevated temperatures, such as low as 60° C.

The lithium metal anode provides a very high capacity and the lowest potential of all metallic anode materials. Therefore, it is not only used in commercial primary lithium metal batteries, but is also proposed as an anode material in rechargeable lithium/air and lithium/sulfur batteries, which are considered as super-high specific energy accumulators of tomorrow. These high energy batteries are urgently demanded to meet a longer driving range in electric vehicles (electro-mobility). However, the rechargeable lithium metal anode suffers from poor rechargeability and low safety. Due to the low potential, the electrolytes traditionally used are thermodynamically not stable against lithium. Their reductive decomposition and the parallel corrosion of the Li electrode lead to the formation of the SEI. This passivating film is supposed to slow down or in the ideal case even prevent electrolyte decomposition. In addition, heterogeneous lithium deposition and dissolution during charge and discharge of the lithium metal anode eventually leads to high surface area lithium, commonly called lithium dendrites in most of the organic solvent-based electrolytes. This may cause a loss of active material due to enhanced lithium corrosion at the high surface area Li, as well as due to the disconnection of dendrites from electronic contact. In addition, short-circuit of the cell may happen when the dendrites grow across the electrolyte to the cathode. In any case, the continuous creation of new lithium surfaces by dendrite formation leads to continuous electrolyte decomposition during cycling.

Overpotentials are generated by kinetic hindrances in the system. In lithium plating and stripping processes, these may include the lithium-ion transport in the electrolyte and in the electrode/electrolyte interphase, such as the SEI, and always the kinetic hindrance of the lithium-ion reduction and oxidation processes at the electrode itself, influencing the charge transfer resistance.

To reduce the flammability of the electrolyte solution, organophosphorus compounds, such as phosphates and cyclic Pzs, have been investigated as an additive or co-solvent to the electrolyte solution. PA compounds, which include a phosphorus-nitrogen double bond, and additional substituents on the phosphorus and nitrogen, are known in the art as synthetic intermediates in the formation of polyphosphazene compounds or cyclic Pz compounds. PA compounds have been disclosed for use in positive electrodes of lithium primary cells and for use in electrolyte solutions in combination with an aprotic organic solvent. See Wu et al., "An Electrochemically Compatible and Flame-Retardant Electrolyte Additive for Safe Lithium-ion Batteries", J. Power Sources 227 (2013) 106-110, expressly incorporated herein by reference in its entirety, which discusses a phosphazenic compound as an electrolyte additive. The phosphazenic compound was triethoxyphosphazen-N-phosphoryldiethylester (PNP), which included a phosphine oxide functional group bonded to a nitrogen atom of the phosphazenic compound. The electrochemical characterization of the PNP-containing electrolyte was tested in MCMB/Li half-cells at 0% loading, 10% loading, 20% loading, 50% loading, and pure PNP, showing a 20% decrease in capacity at 20% loading. At 10% loading, there was little observed difference when compared to traditional electrolytes. However, loadings in excess of 20%, for example, at 50% and 100%, were not able to cycle effectively.

US 2015340739 (Klaehn et al.), expressly incorporated herein by reference in its entirety, discloses an electrolyte solution comprising at least one PA compound and a metal salt. The at least one PA compound comprises a compound of the chemical structure X—N═P($R^1$,$R^2$,$R^3$), where X is an organosilyl group (e.g., trimethyl silyl), an alkyl group, or an aryl group (e.g., a tert-butyl group) and each of $R^1$, $R^2$, and $R^3$ is independently selected from the group consisting of an alkyl group, an aryl group, an alkoxy group, or an aryloxy group, or a sulfur or nitrogen analogue thereof. The PA compound is an acyclic (e.g., linear) compound that includes a double bond between a phosphorus atom and a nitrogen atom of the PA compound. Three pendant groups are bonded to the phosphorus atom, and a pendant group is bonded to the nitrogen atom. The PA compound is a monomeric Pz compound. A cationic pendant group may also be used as at least one of $R^1$, $R^2$, and $R^3$. The choice of functional group (X) bonded to the nitrogen atom may be more limited by synthetic chemistry techniques than is the choice of functional group bonded to the phosphorus atom. The pendant groups on each of the phosphorus atom and the nitrogen atom may be the same as, or different from, one another. The PA compound should not include a halogen directly bonded to the phosphorus for stability. However, a halogen may otherwise be a substituent.

See, U.S. Pat. Nos. 4,248,868; 4,613,676; 4,719,288; 4,722,877; 4,727,060; 4,772,433; 4,810,599; 4,828,945; 4,863,903; 4,931,591; 4,985,317; 5,041,346; 5,061,581; 5,110,694; 5,114,809; 5,153,080; 5,153,082; 5,176,969; 5,180,645; 5,188,783; 5,190,695; 5,337,184; 5,420,000; 5,426,005; 5,443,601; 5,474,860; 5,548,055; 5,567,783; 5,576,120; 5,591,545; 5,633,098; 5,660,948; 5,672,446; 5,672,465; 5,698,338; 5,700,298; 5,707,760; 5,725,968; 5,728,489; 5,731,104; 5,744,264; 5,753,388; 5,756,231; 5,780,182; 5,783,333; 5,786,110; 5,789,110; 5,824,434; 5,843,592; 5,851,504; 5,912,093; 5,962,169; 5,998,559; 6,007,947; 6,013,393; 6,015,638; 6,087,426; 6,096,453; 6,103,419; 6,103,426; 6,168,885; 6,207,326; 6,316,149; 6,379,842; 6,391,492; 6,395,423; 6,413,675; 6,413,676; 6,416,905; 6,444,370; 6,447,952; 6,472,104; 6,475,679; 6,475,680; 6,492,449; 6,599,664; 6,605,237; 6,645,675; 6,664,006; 6,699,623; 6,721,168; 6,759,164; 6,759,460; 6,797,019; 6,815,119; 6,828,065; 6,841,301; 6,893,774; 6,908,186; 6,955,867; 7,005,206; 7,008,564; 7,052,805; 7,060,744; 7,067,219; 7,077,516; 7,081,320; 7,084,290; 7,091,266; 7,094,501; 7,099,142; 7,118,694; 7,226,702; 7,229,719; 7,238,450; 7,247,740; 7,273,597; 7,285,362; 7,316,855; 7,378,193; 7,410,731; 7,429,433; 7,473,491; 7,494,745; 7,498,102; 7,524,439; 7,557,637; 7,560,595; 7,579,118; 7,582,380; 7,585,587; 7,585,994; 7,588,859; 7,598,002; 7,656,125; 7,678,505; 7,695,860; 7,695,862; 7,713,449; 7,718,321; 7,718,826; 7,759,418; 7,781,105; 7,811,707; 7,811,708; 7,820,328; 7,824,800; 7,828,728; 7,838,143; 7,851,090; 7,875,204; 7,875,393; 7,939,199; 7,939,206; 7,951,495; 7,976,983; 7,977,393; 7,989,109; 8,000,084; 8,00,3241; 8,003,256; 8,012,615; 8,030,500; 8,034,491; 8,048,569; 8,062,796; 8,071,233; 8,076,031; 8,076,032; 8,084,998; 8,092,940; 8,119,038; 8,124,269; 8,133,614; 8,137,844; 8,153,307; 8,168,330; 8,168,831; 8,178,009; 8,187,749; 8,211,336; 8,221,915; 8,227,103; 8,236,449; 8,257,866; 8,257,870; 8,263,697; 8,268,197; 8,287,483; 8,301,322; 8,308,971; 8,309,240; 8,357,450; 8,367,755; 8,377,596; 8,384,058; 8,415,045; 8,420,266; 8,450,012; 8,455,141; 8,465,871; 8,470,472; 8,486,560; 8,486,565; 8,512,896; 8,512,899; 8,524,399; 8,556,996; 8,562,873; 8,574,773; 8,579,994; 8,592,081; 8,597,815; 8,597,827; 8,628,873; 8,652,688; 8,658,062; 8,669,114; 8,673,499; 8,679,670; 8,679,684; 8,686,074; 8,703,310; 8,703,344; 8,715,863; 8,728,170; 8,734,668; 8,734,674; 8,734,988; 8,741,486; 8,754,138; 8,765,295; 8,778,533; 8,785,022; 8,795,886; 8,795,903; 8,801,810; 8,802,285; 8,814,956; 8,815,432; 8,822,084; 8,822,088; 8,828,605; 8,841,035; 8,845,764; 8,846,249; 8,846,251; 8,846,922; 8,852,801; 8,852,813; 8,870,810; 8,871,385; 8,889,301; 8,900,754; 8,906,549; 8,922,959; 8,927,127; 8,945,774; 8,974,947; 8,986,881; 8,999,009; 9,012,093; 9,012,094; 9,077,037; 9,077,046; 9,093,716; 9,099,252; 9,099,756; 9,105,908; 9,105,942; 9,111,684; 9,112,212; 9,118,088; 9,123,973; 9,130,214; 9,130,245; 9,142,357; 9,147,906; 9,166,206; 9,166,222; 9,166,249; 9,172,076; 9,172,088; 9,172,094; 9,183,995; 9,184,467; 9,184,468; 9,190,616; 9,190,695; 9,190,698; 9,196,926; 9,203,084; 9,203,107; 9,203,113; 9,206,210; 9,207,513; 9,209,456; 9,214,659; 9,219,274; 9,227,850; 9,230,746; 9,231,243; 9,236,634; 9,236,635; 9,240,614; 9,246,150; 9,252,399; 9,257,720; 9,263,731; 9,263,764; 9,273,399; 9,281,541; 9,281,543; 9,284,324; 9,287,560; 9,293,749; 9,293,787; 9,293,796; RE37076; 20010004506; 20010004507; 20010012590; 20020014616; 20020031701; 20020039275; 20020048706; 20020055047; 20020076611; 20020085968; 20020090331; 20020090547; 20020094311; 20020098135; 20020100725; 20020102196; 20020110739; 20020122979; 20020127162; 20020127169; 20020127454; 20020128364; 20020136681; 20020136683; 20020150524; 20020155353; 20020159943; 20020160270; 20020182488; 20020185627; 20020193533; 20020197522; 20020197531; 20030003369; 20030059683; 20030068555; 20030091904; 20030108801; 20030113635; 20030125437; 20030129500; 20030148191; 20030170548; 20030175597; 20030175598; 20030190531; 20030198868; 20040009404; 20040013927; 20040039134; 20040053138;

20040085710; 20040126305; 20040126658; 20040126659; 20040139587; 20040142246; 20040146778; 20040146786; 20040151985; 20040157122; 20040158091; 20040170901; 20040189762; 20040189763; 20040191635; 20040192853; 20040220348; 20050008938; 20050042503; 20050085655; 20050095197; 20050095504; 20050106458; 20050106460; 20050123836; 20050136329; 20050153207; 20050158626; 20050164093; 20050175529; 20050175904; 20050181280; 20050214700; 20050215764; 20050221168; 20050228087; 20050249656; 20050249667; 20050255385; 20050260120; 20050272214; 20060032046; 20060034943; 20060035137; 20060046151; 20060073381; 20060121355; 20060147371; 20060147807; 20060154144; 20060154147; 20060166098; 20060172200; 20060180796; 20060194119; 20060204856; 20060210873; 20060210883; 20060217568; 20060269834; 20060281010; 20060281011; 20060292451; 20070020529; 20070026315; 20070027129; 20070029972; 20070037046; 20070037063; 20070040154; 20070043158; 20070048209; 20070048596; 20070048622; 20070048623; 20070054180; 20070077496; 20070092549; 20070117007; 20070141470; 20070149496; 20070166617; 20070172740; 20070180688; 20070182418; 20070183954; 20070207384; 20070212615; 20070216469; 20070243470; 20070298314; 20080008928; 20080008933; 20080020276; 20080020285; 20080044736; 20080051495; 20080063585; 20080063588; 20080075999; 20080089830; 20080096056; 20080099734; 20080107586; 20080118428; 20080118843; 20080119421; 20080138700; 20080152996; 20080153005; 20080160417; 20080164444; 20080171268; 20080176141; 20080193840; 20080193848; 20080213588; 20080213661; 20080224100; 20080233477; 20080241693; 20080241699; 20080254361; 20080261116; 20080269492; 20080311025; 20090004094; 20090005824; 20090011340; 20090017364; 20090023071; 20090027827; 20090029138; 20090029193; 20090035656; 20090075176; 20090081547; 20090081548; 20090104523; 20090123813; 20090130567; 20090136854; 20090155696; 20090155697; 20090169463; 20090181296; 20090186267; 20090191464; 20090208835; 20090246625; 20090246628; 20090253035; 20090253046; 20090256528; 20090259420; 20090269654; 20090269673; 20090280400; 20090291330; 20090297937; 20090305016; 20090311587; 20100009260; 20100015521; 20100018034; 20100047695; 20100062345; 20100068461; 20100068605; 20100075222; 20100075225; 20100078599; 20100086823; 20100090650; 20100119881; 20100119956; 20100124691; 20100125082; 20100125087; 20100136410; 20100143770; 20100159346; 20100164436; 20100167121; 20100173139; 20100178555; 20100183917; 20100190059; 20100200403; 20100209782; 20100216016; 20100216027; 20100224824; 20100233523; 20100240813; 20100255356; 20100279155; 20100285352; 20100285354; 20100285358; 20100285373; 20100297502; 20100299008; 20100304205; 20100304223; 20100310941; 20100323238; 20100330410; 20100330419; 20100330421; 20100330423; 20100330425; 20110014527; 20110020704; 20110020706; 20110024396; 20110027656; 20110033734; 20110033756; 20110039157; 20110049745; 20110052966; 20110059349; 20110067230; 20110070495; 20110070504; 20110077880; 20110081563; 20110081581; 20110086781; 20110097628; 20110097630; 20110098463; 20110104553; 20110104565; 20110111294; 20110111304; 20110117407; 20110117445; 20110117446; 20110123869; 20110136019; 20110143201; 20110143219; 20110159329; 20110159365; 20110159377; 20110159379; 20110171502; 20110177393; 20110181249; 20110183216; 20110189512; 20110189520; 20110189548; 20110189579; 20110195318; 20110200874; 20110206979; 20110206994; 20110207000; 20110229761; 20110236751; 20110236765; 20110250503; 20110256457; 20110264381; 20110274977; 20110287316; 20110287318; 20110293997; 20110301931; 20110305949; 20110305958; 20110319426; 20120003514; 20120003518; 20120007560; 20120015249; 20120021286; 20120028105; 20120034512; 20120045670; 20120052401; 20120058377; 20120060360; 20120064396; 20120070741; 20120077076; 20120077082; 20120082873; 20120082890; 20120082902; 20120082903; 20120088155; 20120088162; 20120094178; 20120100438; 20120105007; 20120107680; 20120107697; 20120107726; 20120115018; 20120121974; 20120121989; 20120121991; 20120129019; 20120129046; 20120133341; 20120135312; 20120141864; 20120141866; 20120141867; 20120141869; 20120141878; 20120141883; 20120141884; 20120148922; 20120155507; 20120164519; 20120164541; 20120169297; 20120171536; 20120171542; 20120175552; 20120177995; 20120183842; 20120183843; 20120183856; 20120183865; 20120183866; 20120188086; 20120189920; 20120202112; 20120208087; 20120218683; 20120219865; 20120225331; 20120225358; 20120225359; 20120231308; 20120231325; 20120231352; 20120244391; 20120244417; 20120251886; 20120251892; 20120273737; 20120276445; 20120288750; 20120288751; 20120288769; 20120289887; 20120293916; 20120295155; 20120295165; 20120301789; 20120301797; 20120308894; 20120315535; 20120315549; 20120321959; 20120328942; 20120328952; 20130004839; 20130004862; 20130011728; 20130011736; 20130017443; 20130017453; 20130022863; 20130022880; 20130026409; 20130040203; 20130043843; 20130048923; 20130052528; 20130052542; 20130055559; 20130059172; 20130065122; 20130065130; 20130069601; 20130069658; 20130069661; 20130071733; 20130071739; 20130071762; 20130072154; 20130078525; 20130084495; 20130084496; 20130084501; 20130088204; 20130089793; 20130090900; 20130092866; 20130095351; 20130095392; 20130100563; 20130108899; 20130108930; 20130115520; 20130115529; 20130130069; 20130130121; 20130130128; 20130135110; 20130136981; 20130143090; 20130143129; 20130149567; 20130149602; 20130149605; 20130157147; 20130157149; 20130157152; 20130163148; 20130164611; 20130164612; 20130169238; 20130171340; 20130171502; 20130171512; 20130177814; 20130183579; 20130183580; 20130189575; 20130189579; 20130195805; 20130196223; 20130196235; 20130199936; 20130202920; 20130202955; 20130202956; 20130202959; 20130202967; 20130202973; 20130209860; 20130209869; 20130209870; 20130209887; 20130209897; 20130216899; 20130216907; 20130216908; 20130216918; 20130216920; 20130224576; 20130224583; 20130230772; 20130230773; 20130230779; 20130232772; 20130234074; 20130236750; 20130236766; 20130244102; 20130244107; 20130252090; 20130252101; 20130260222; 20130260229; 20130260232; 20130260254; 20130260255; 20130264999; 20130266827; 20130266846; 20130266858; 20130266866; 20130271089; 20130277599; 20130280592; 20130280621; 20130288084; 20130288113; 20130288120; 20130288138; 20130295439; 20130295461; 20130295465; 20130295492; 20130302650; 20130302679; 20130302697; 20130302702; 20130309527; 20130309549; 20130309564; 20130309571; 20130316248; 20130319870; 20130320582; 20130323585; 20130323595; 20130323605; 20130327648; 20130330609; 20130330637; 20130337304; 20130337335; 20130337338; 20130337339; 20130337340; 20130337341; 20130337343; 20130337346; 20130344360; 20130344383; 20130344391; 20130344392; 20140011081; 20140011088; 20140015160; 20140017549; 20140017559; 20140017568; 20140017573; 20140023932; 20140023934; 20140030609; 20140030610; 20140030623; 20140038059; 20140038060; 20140045015; 20140045016; 20140045017; 20140045019; 20140045020; 20140045021; 20140045022; 20140045065; 20140050910;

20140050972; 20140057168; 20140057169; 20140057172; 20140057173; 20140057179; 20140065479; 20140072837; 20140072843; 20140072877; 20140087214; 20140087250; 20140087251; 20140087257; 20140093780; 20140093787; 20140099560; 20140106219; 20140107326; 20140113202; 20140113203; 20140117940; 20140125292; 20140127567; 20140127575; 20140132220; 20140134499; 20140134501; 20140134521; 20140138591; 20140141336; 20140141337; 20140141340; 20140147741; 20140147752; 20140154546; 20140154557; 20140154559; 20140154587; 20140154590; 20140162130; 20140162131; 20140166929; 20140166939; 20140170303; 20140170475; 20140170482; 20140170498; 20140170503; 20140170524; 20140173300; 20140176074; 20140176076; 20140178759; 20140178770; 20140178772; 20140184162; 20140184172; 20140193712; 20140197801; 20140197805; 20140199585; 20140199599; 20140199600; 20140205905; 20140212752; 20140212763; 20140212770; 20140220417; 20140220422; 20140227432; 20140230887; 20140234693; 20140234705; 20140234711; 20140234712; 20140234713; 20140234727; 20140234732; 20140242445; 20140242453; 20140242469; 20140242474; 20140248521; 20140248537; 20140264198; 20140266075; 20140272132; 20140272489; 20140272531; 20140272553; 20140272558; 20140272567; 20140272568; 20140272574; 20140272576; 20140272577; 20140272578; 20140272579; 20140272580; 20140272583; 20140272591; 20140287305; 20140287325; 20140287330; 20140295268; 20140295270; 20140295290; 20140302354; 20140302400; 20140308562; 20140308583; 20140308585; 20140308588; 20140310951; 20140312269; 20140314948; 20140315072; 20140315097; 20140322579; 20140322602; 20140329120; 20140329131; 20140329150; 20140335406; 20140335410; 20140335411; 20140342200; 20140342228; 20140342240; 20140346618; 20140349182; 20140349186; 20140356708; 20140356735; 20140363735; 20140363746; 20140370380; 20140370387; 20140376160; 20140377635; 20140377667; 20140377668; 20150002162; 20150004444; 20150004480; 20150004482; 20150004488; 20150004495; 20150010460; 20150010784; 20150017541; 20150017543; 20150024279; 20150030856; 20150030939; 20150037675; 20150037686; 20150037690; 20150044517; 20150044533; 20150044556; 20150044571; 20150044573; 20150050535; 20150050564; 20150050565; 20150056488; 20150056507; 20150056509; 20150056514; 20150056516; 20150062687; 20150064568; 20150064578; 20150064580; 20150069307; 20150072225; 20150072232; 20150072247; 20150079477; 20150079483; 20150079484; 20150086876; 20150086877; 20150089797; 20150093631; 20150093647; 20150093653; 20150099165; 20150099184; 20150099185; 20150099187; 20150099191; 20150099192; 20150102257; 20150104701; 20150104712; 20150104716; 20150111078; 20150111099; 20150118558; 20150118565; 20150118572; 20150125595; 20150125752; 20150125759; 20150125761; 20150137030; 20150140206; 20150140427; 20150140434; 20150140446; 20150147624; 20150147642; 20150147645; 20150147662; 20150152566; 20150155546; 20150155557; 20150162139; 20150162588; 20150162603; 20150171414; 20150171426; 20150179976; 20150180001; 20150180023; 20150180087; 20150180249; 20150188125; 20150188191; 20150191841; 20150194702; 20150200390; 20150200422; 20150207147; 20150207174; 20150207176; 20150210044; 20150214529; 20150214573; 20150214577; 20150221936; 20150221983; 20150221987; 20150228980; 20150236343; 20150236372; 20150236378; 20150236380; 20150243972; 20150243973; 20150243987; 20150243988; 20150244041; 20150249247; 20150249262; 20150263342; 20150263379; 20150263543; 20150270552; 20150270573; 20150280219; 20150280229; 20150280267; 20150288031; 20150295241; 20150295275; 20150295276; 20150303481; 20150311509; 20150311525; 20150311564; 20150318543; 20150318570; 20150318572; 20150318578; 20150318580; 20150325843; 20150325852; 20150325880; 20150325882; 20150325884; 20150333310; 20150333315; 20150333370; 20150340679; 20150340739; 20150349338; 20150357646; 20150364747; 20150364748; 20150364755; 20150364791; 20150364794; 20150364795; 20150364796; 20150372296; 20150372305; 20150372346; 20150372349; 20150373831; 20150377977; 20150380355; 20150380731; 20150380772; 20150380777; each of which is expressly incorporated herein by reference in its entirety.

SUMMARY OF THE INVENTION

The present technology includes the use of an all-inorganic electrolyte system suitable for a wide variety of energy storage systems, especially lithium-ion chemistry. The key composition of the solvent system provides a combination of two distinct classes of phosphorus compounds; PA and Pz, in an electrolyte system which substantially excludes (e.g., <2% by weight) organic carbonates. Each class of phosphorus-based compounds has both benefits and limitations alone. Yet, each of the sets of limitations can be designed in such a fashion as to retain the beneficial properties of each distinct class, while simultaneously significantly reducing or altogether eliminating the limitations of either class alone. Preferably, a MP compound, e.g., a phosphate, phosphonate, phosphinate, phosphine or phosphine oxide, with substituents that are generally non-reactive with the battery chemistry and stable under battery operational conditions, is provided in the electrolyte system as well.

The inorganic solvent system can greatly improve lithium-ion batteries by better controlling the issues of volatility, flammability, and thermal and electrochemical instability inherent to organic solvents that lead to significant cell degradation and catastrophic failure. Additionally, the PA/Pz solvent system has improved performance pertaining to the aforementioned issues as they relate to the bulk electrolyte solution and the SEI. The SEI formed in the PA/Pz system in a lithium-ion battery is believed to be breakdown products of the PA and Pz (and also the MP, if present), i.e., rich in phosphorus-nitrogen compounds, which may be largely inorganic, even if the substituents of the PA, Pz, or MP include organic ligands. This SEI is believed to be distinct from the SEI formed using other electrolyte chemistries. Note that the SEI at the anode and cathode will differ, due to the relative preponderance of oxidative and reductive processes at each. Therefore, it is preferred that a stable SEI form from the electrolyte components at all electrochemically active regions of the battery, or other energy storage device. When the electrolyte is used in other types of devices, the formation and criticality of an SEI is dependent on the characteristics of the respective electrochemical system.

The SEI acts to prevent direct contact of the electrolyte molecules with the surface of the electrode, while allowing charge carrier transport. Because the surface of the electrodes is dynamic, a small portion of the SEI redevelops during each charge/discharge cycle from the electrolyte components in contact with the electrode interface with the bulk electrolyte. The cathode also has an SEI, though the cathode surface is less dynamic than the anode. Therefore, the electrolyte medium itself is involved in electrochemical reactions with the electrodes, and should be selected to provide stability under such conditions. It is noted that the difficult-to-characterize chemical makeup of the SEI formed from the PA and Pz is an efficient free radical quencher, and thus once formed, provides an effective barrier that protects the bulk electrolyte from continuous degradation.

See, Sazhin, Sergiy V., Mason K. Harrup, and Kevin L. Gering. "Characterization of low-flammability electrolytes for lithium-ion batteries." *Journal of Power Sources* 196.7 (2011): 3433-3438; Harrup, Mason K., et al. "Unsaturated phosphazenes as co-solvents for lithium-ion battery electrolytes." Journal of Power Sources 278 (2015): 794-801; Xu, Kang, et al. "An attempt to formulate nonflammable lithium-ion electrolytes with alkyl phosphates and phosphazenes." Journal of The Electrochemical Society 149.5 (2002): A622-A626; Gering, Kevin L., et al. Section IV. D. 3 for DOE 2013 Annual Report: Novel Phosphazene-Based Compounds to Enhance Safety and Stability of Cell Chemistries for High Voltage Applications (INL). No. INL/EXT-13-30529. Idaho National Laboratory (INL), 2013; Rollins, Harry W., et al. "Fluorinated phosphazene co-solvents for improved thermal and safety performance in lithium-ion battery electrolytes." Journal of Power Sources 263 (2014): 66-74; Choi, Ji-Ae, Yongku Kang, and Dong-Won Kim. "Lithium polymer cell assembled by in situ chemical cross-linking of ionic liquid electrolyte with phosphazene-based cross-linking agent." Electrochimica Acta 89 (2013): 359-364; Gering, Kevin, M. Harrup, and E. Dufek. "Integrated Carbon-Reduced Battery Chemistries for Safer Alternative Li-Ion Cells." 224*th ECS Meeting* (Oct. 27-Nov. 1, 2013). Ecs, 2013; Harrup, Mason, Eric J. Dufek, and Kevin L. Gering. "Integrated Carbon-Reduced Battery Chemistries for Safer Alternative Li-Ion Cells." *Meeting Abstracts*. No. 14. The Electrochemical Society, 2013; Bieker, Georg, Martin Winter, and Peter Bieker. "Electrochemical in situ investigations of SEI and dendrite formation on the lithium metal anode." *Physical Chemistry Chemical Physics* 17.14 (2015): 8670-8679; Harrup, Mason K., et al. "Unsaturated phosphazenes as co-solvents for lithium-ion battery electrolytes." Journal of Power Sources 278 (2015): 794-801; Wu, Bingbin, et al. "An electrochemically compatible and flame-retardant electrolyte additive for safe lithium ion batteries." Journal of Power Sources 227 (2013): 106-110; Harrup, Mason K., et al. "Phosphazene Based Additives for Improvement of Safety and Battery Lifetimes in Lithium-Ion Batteries." ECS Transactions 41.39 (2012): 13-25; Zhang, Qing, et al. "Improved thermal stability of $LiCoO_2$ by cyclotriphosphazene additives in lithium-ion batteries." Chemistry Letters 34.7 (2005): 1012-1013; Benson, Michael T., Mason K. Harrup, and Kevin L. Gering. "Lithium binding in fluorinated phosphazene trimers." Computational and Theoretical Chemistry 1005 (2013): 25-34; Zhang, Sheng Shui. "A review on electrolyte additives for lithium-ion batteries." Journal of Power Sources 162.2 (2006): 1379-1394; Cao, Xia, et al. "Novel phosphamide additive to improve thermal stability of solid electrolyte interphase on graphite anode in lithium-ion batteries." ACS applied materials & interfaces 5.22 (2013): 11494-11497. , each of which is expressly incorporated herein by reference in its entirety. See also Patent Appl. Nos. and U.S. Pat. Nos. 6,146,787; 6,544,690; 6,723,349; 7,008,564; 7,282,295; 7,282,296; 7,282,302; 7,285,362; 7,390,591; 7,491,458; 7,608,178; 7,645,543; 7,666,233; 7,691,289; 7,704,468; 7,781,108; 7,829,212; 7,838,144; 7,858,223; 7,864,397; 7,998,626; 8,048,571; 8,114,171; 8,182,943; 8,202,649; 8,293,398; 8,323,820; 8,334,075; 8,361,664; 8,389,147; 8,455,131; 8,459,213; 8,501,339; 8,529,867; 8,652,686; 8,652,692; 8,658,304; 8,671,684; 8,673,477; 8,709,679; 8,778,522; 8,828,573; 8,828,574; 8,828,575; 8,916,291; 8,932,771; 8,980,602; 8,986,638; 9,0516,29; 9,061,261; 9,123,941; 9,136,568; 9,187,834; 9,187,835; 9,190,695; 9,200,375; 9,206,210; 9,257,720; 9,269,998; 9,287,573; 20040009404; 20050255385; 20080096056; 20100094042; 20120088162; 20130089793; 20130259776; 20140140912; 20140342240; 20150340739; each of which is expressly incorporated herein by reference in its entirety.

In one embodiment, the PA/Pz solvent mixture includes the addition of an inorganic MP compound to further improve (reduce) the viscosity and ionic conductivity (increase) of the solvent mixture without adversely impacting the mixture's volatility, flammability, and thermal stability. At operating temperatures of 0° C.-50° C., the MP is typically provided, whereas in case of high temperature operation, the viscosity of the PA and Pz may be sufficiently low to permit efficient operation without the MP. This addition makes the solvent an ideal electrolyte for high discharge rate battery applications. Further, due to the greatly increased electrochemical window of stability versus organic systems, the use of high energy electrode couples is provided. Numerous examples of these couples exist, but are not in current use due to the limitations of the traditionally used organic electrolyte systems.

There are well documented inherent limitations in current lithium-ion battery technologies. Some of these limitations arise from the organic electrolyte solvents due to their volatility, flammability, and thermal and electrochemical instability as they pertain to bulk electrolyte solution and the SEI. According to the present technology, the organic electrolyte solvents may be replaced with an all-inorganic electrolyte solvent system. "All-inorganic" is not intended to exclude organic substituents on inorganic core molecules. For example, 95% or greater by weight of the solvent may comprise phosphorus-containing compounds, and preferably 98% or greater by weight. Small amounts of other components are acceptable, so long as they do not greatly increase the vapor pressure or flammability of the composite.

In a preferred embodiment, the electrolyte solvent system is composed solely of phosphorus-compounds as a mixture of primary solvent PA derivatives and co-solvent Pz derivatives with a suitable supporting salt, i.e., a supporting lithium salt, in the case of a lithium battery. In addition, an inorganic MP compound can be added to this mixture, for example to further improve the solvent's capacity to work for high discharge applications without impacting the other benefits of the PA/Pz mixtures. In battery usage, the solvent system should solvate the charge carrier ion, i.e., a metal ion, to permit charge carrier densities of at least 0.1M, more preferably 0.5M, and most preferably greater than 1.0M. Further, in battery usage, the solvated charge carrier ions should not be tightly complexed to the solvent, and therefore the effective charge carrier ion should be the metal ion itself and not a solvent-molecule bound metal ion. In some cases, a minor portion of the electrolyte may bind charge carriers, especially if a source of charge carriers is provided in excess with respect to the complex-forming component. Further, while the solvent system is preferably non-reactive with the static battery chemistry, is preferably has a sufficient level of reactivity with the electrodes during battery cycling to form an SEI to effectively isolate the bulk electrolyte from the electrode surface, while permitting ion mobility through the SEI to the electrodes. Useful characteristics of the electrolyte are lack of flammability in air at standard temperature and pressure, low vapor pressure at 30° C. (e.g., less than 50 mBar, preferably less than 10 mBar, more preferably less than 5 mBar, and most preferably less than 1 mBar, all at 25° C.), low viscosity at 30° C. (≤30 cp), low toxicity (or reasonable method for detoxification), and an efficient biodegradation pathway at the end of the useful life.

Other types of batteries than lithium may be provided, such as sodium, potassium, aluminum, magnesium, manganese, vanadium, and the like. In such cases, the supporting salt and appropriate electrodes will of course correspond to the battery chemistry. In some cases, the solvent is not an electrolyte, or is provided as a potential electrolyte solvent prior to addition of a charge carrier. The solvent finds particular application in energy storage devices.

As used herein, the term "energy storage device" means and includes a device configured and comprising materials formulated to convert stored chemical energy into electrical energy or electrical energy into chemical energy. The energy storage device may include, but is not limited to, a battery or a capacitor. By way of example only, the energy storage device may be a metal-ion battery, a metal battery (e.g., Li, Na, K, Mg, Mn, V, etc.), an ultracapacitor, or a supercapacitor. In the case of capacitive energy storage systems, the formation of an SEI is not critical.

The pendant groups on the PA compound may be selected based on desired properties of the PA compound, such as to achieve sufficient stability, viscosity, flammability, salt solubility, ion transport, and cell cyclability properties of the PA compound to be used as the electrolyte or in the electrolyte solution. A desired balance of these properties may be achieved by appropriately selecting the pendant groups. The PA compound may be tailored to exhibit a low viscosity at room temperature, stability with respect to the electrochemical system chemistry (e.g., toward lithium or other metal, e.g., a high lithium or sodium salt, or other alkali metal, alkaline earth metal, transitional metal, or post transition metal salt) solubility, stability at high voltage, low flammability, and low volatility by appropriately selecting the pendant groups. The viscosity of the PA compound may be directly proportional to the molecular weight of the PA compound, which is, in turn, affected by the molecular weight of the pendant groups. By minimizing the molecular weight of the pendant groups, the PA compound may exhibit a viscosity within the desired range. To achieve the desired viscosity, the pendant groups may be selected to produce an asymmetric PA compound, i.e., a PA compound having different substituents on the phosphorus atom, which is believed to minimize molecular scale ordering and discourage a high extent of solvent self-association, aggressive multi-dentate bridging with an ionic species, and the generation of ordered or crystalline structures. Note that the viscosity of the mixed-component solvent is not directly related to the viscosity of the respective components, but as a first approximation, a lower viscosity of a significant solution component will yield a lower viscosity aggregate solution. Note also that addition of the supporting salt to the aggregate solution may also alter the viscosity.

The phosphorus substituents may also be selected such that the PA compound does not easily conform to solvate cations past mono-dentate coordination, including electron withdrawing moieties, such as fluorine. The PA compound may also be formulated in the electrolyte solution with dissimilar compounds to avoid solvent-to-solvent molecular association. These properties may directly impact the charge transfer process in the energy storage device where ions need to be able to readily associate and de-associate with solvent members through ion solvation, which has thermodynamic and kinetic costs in terms of energy and time requirements. Thus, selecting the pendant groups to achieve lower viscosity of the PA compound may additionally make the energy storage device more efficient by economizing charge transfer at each electrode interface. If, however, the PA compound is to be used as an additive in the electrolyte solution, the viscosity may be greater than the range described below to account for mixture effects with the electrolyte solution. The pendant groups may also be selected to provide the PA compound with sufficient electrochemical stability for use in the electrochemical environment of the energy storage device.

The pendant groups may also be selected such that the PA compound has a supporting salt solubility of at least about 1.0 M concentration at room temperature. If, however, the PA compound is to be used as an additive in the electrolyte solution, the salt solubility may be less than the above-mentioned concentration to account for mixture effects with the electrolyte solution. The salt solubility of the PA compound may also be improved by interactions with other components of the electrolyte solution. However, the PA compound may still have the ability to desolvate from the supporting salt cations to enable adequate cycling efficiencies and allow acceptable rate capabilities.

The pendant groups on the PA compound may be selected such that the PA compound is a liquid at room temperature (from about 20° C. to about 25° C.) and at the temperature of use, e.g., 0° C. or below to 60° C. or above, is stable at a temperature greater than about 150° C., and is substantially non-flammable at operating temperatures to which the electrolyte solution is exposed, e.g., ≤65° C. The PA compound of the electrolyte solution may also be stable at high voltages, such as greater than about 4.5 V, during cycling of the energy storage device including the electrolyte solution. The pendant groups on the PA compound may be selected such that the PA compound has an increased flash point and a decreased flame duration as compared to organic electrolytes, resulting in reduced flammability of the electrolyte solution.

The melting point of the PA compound may be in a range of from about −30° C. to about 10° C. so that the PA compound is a liquid at room temperature and at the temperature of use. Note that the PA compound is a component of the electrolyte solution, and therefore the melting point of the PA compound alone is not dispositive. Since the PA compound is to be used in the energy storage device, such as a battery, the temperature of use may be within a range of from about −25° C. to about 150° C. To maintain the PA compound as a liquid, the pendant groups may include at least one of a fluorinated alkyl group, an aryl group, the organosilyl group, an oxygen-containing containing organic group, and a branched organic group on the nitrogen atom, and different R groups ($R^1$, $R^2$, $R^3$) may be used on the phosphorus atom. By selecting the X group from these functional groups, crystal packing may be disrupted so that the PA compound may remain a liquid at room temperature.

A phosphine oxide functional group bonded to the nitrogen atom of the PA compound, i.e., X is $[-P(=O)R_2]$, may be avoided because the P=O bond is strongly attracted to lithium ions.

The term "alkyl" means and includes a saturated, unsaturated, straight, branched, or cyclic hydrocarbon containing from one carbon atom to ten carbon atoms. Examples include, but are not limited to, methyl, ethyl, propyl(n-propyl, isopropyl, cyclopropyl), butyl(n-butyl, isobutyl, sec-butyl, tert-butyl, cyclobutyl), pentyl(n-pentyl, tert-pentyl, neopentyl, isopentyl, sec-pentyl, 3-pentyl, cyclopentyl), hexyl(isohexyl, cyclohexyl, 3-methylpentyl, 2,2-dimethylbutyl, 2,3-dimethylbutyl), heptyl, octyl, nonyl, or decyl. The term "alkoxy" means and includes an alkyl group linked to an oxygen atom. The alkoxy group may include, but is not limited to, a methoxy group, an ethoxy group, a propoxy group, a butoxy group, a pentoxy group, a hexoxy group, a heptoxy group, an octoxy group, a nonoxy group, or a decoxy group, or an alkoxy-substituted alkoxy group (i.e., a polyether group), such as a methoxy methoxy group, a methoxy ethoxy group, an ethoxy methoxy, an ethoxy ethoxy group, a methoxy ethoxy ethoxy group, etc. The term "aryl" means and includes a hydrocarbon with alternating single and double bonds between carbon atoms forming a ring. Examples include, but are not limited to, a phenyl group, a tolyl group, or a naphthyl group. The aryl group may also contain a heteroatom, such as sulfur (thiophene, benzothiophene, etc.), oxygen (furan, benzofuran, etc.), or nitrogen (pyrrole, indole, pyridine, pyrimidine, imidazole, pyrazole, etc.). The term "aryloxy" means and includes an aryl group linked to an oxygen atom. In addition to the oxygen-containing groups (i.e., alkoxy, aryloxy) mentioned above, functional groups including other heteroatoms, such as sulfur or nitrogen, may be present in the pendant group. The heteroatom may link, for example, the alkyl group or the aryl group to the phosphorus atom of the PA compound. By way of example only, the sulfur or nitrogen analogue may include, but is not limited to, an alkylsulfide, an alkylamine, an arylsulfide, or an arylamine. The term "organosilyl" means and includes a compound having at least one carbon-silicon bond. At least one of an alkyl group, an alkoxy group, an aryl group, an aryloxy group, or a halogen group may be bonded to the silicon atom. The groups bonded to the silicon atom may be the same as, or different from, one another. The alkyl group may be further substituted, such as with a halogen. The aryl group may be further substituted, such as with a halogen, an alkyl group, or a haloalkyl group. By way of example only, the organosilyl may be a trialkylsilyl group. The term "halo" or "halogen" means and includes fluoro, chloro, bromo, or iodo. Any of the above-mentioned functional groups may be further substituted with at least one substituent, such as with a halogen, a carboxyl, a carbonyl, a C(O)(alkyl), a carbonate, another keto functional group, an amine, an alkyl, an alkoxy, an alkylthio, an amide, an alkylamino, a dialkylamino, a haloalkyl, a hydroxyalkyl, an alkoxyalkyl, a cyano, a sulfonyl group, or a phosphate group. The cationic pendant group may include, but is not limited to, an ionic form of an aromatic amine, an aryl amine, or an aliphatic amine, such as a nitrogen-containing aryl group, a primary amine, a secondary amine, or a tertiary amine. The aromatic amine may be an aniline group. The nitrogen-containing aryl group may include, but is not limited to, a pyrrole group, an imidazole, a pyrazole, a pyridine group, a pyrazine group, a pyrimidine group, or a pyridazine group. By way of example, the amine group may be a methyl amino group or a dimethyl amino group.

The viscosity of the PA compound alone, or the solvent solution as a whole, may be within a range of from about 1 centipoise (cP) (about 0.001 Pas) to about 30 cP (about 0.03 Pas) at 20° C. or 30° C. or 35° C., such as from about 1 cP (about 0.001 Pas) to less than or equal to about 10 cP (about 0.01 Pas) at 20° C. or 30° C. or 35° C. or from about 1 cP (about 0.001 Pas) to less than or equal to about 7 cP (about 0.007 Pas) at 20° C. or 30° C. or 35° C.

The MP compound, if provided may be a simple organophosphates, organophosphonates, organophosphinates, and/or organic phosphine oxide alkyl and/or aryl derivative. Organophosphates are fully esterified derivatives of phosphoric acid and are conveniently synthesized employing light aliphatic or aryl alcohols. Organophosphates are widely employed both in natural and synthetic applications because of the ease with which organic groups can be linked together. Organic phosphine oxides are similar in structure to the organophosphates, except they contain direct phosphorus-carbon linkages, instead of being bound through a heteroatom, like oxygen. Organophosphonates and organophosphinates have both ester and phosphorus-carbon linkages. These compounds are also readily synthesized, for example as a by-product of the Wittig reaction. Another common route to phosphine oxides is the thermolysis of phosphonium hydroxides. As in the case with the organophosphates, the R-groups may be any light aliphatic or aryl group, and most preferred is for each molecule to have a plurality of differing groups attached to the same central phosphorus.

The metal salt may be a salt of lithium, sodium, potassium, magnesium, manganese, or other alkali metal or alkaline earth metal, or vanadium, or other metals. The solvent solution as a whole, may have a high salt solubility, such as from about 0.1 to 5 M, and for example, may be 0.5 M to about 1.2 M, or 0.8 to 1.1 M, in a solution of a metal salt, such as in a lithium salt solution, a sodium salt solution, other alkali metal solution, alkaline earth metal solution, transitional metal solution, or post transition metal solution. By way of example only, the lithium salt may be lithium hexafluorophosphate ($LiPF_6$), lithium tetrafluoroborate ($LiBF_4$), lithium perchlorate ($LiClO_4$), or combinations thereof. The solvent solution with a 1.0 M supporting salt at room temperature may have a conductivity of at least about 5 mS/cm.

The solvent system may provide a good ion cyclability in the energy storage device, such as at least a C/1 equivalent cycling rate. However, when used in consumer electronics, the battery including the solvent may exhibit a lower cycling rate.

The various compounds according to the present technology are produced according to standard techniques, and may be available as commodity products.

The electrolyte solution including the PA compound may be used in an energy storage device (e.g., a battery or capacitor) that includes a positive electrode (e.g., a cathode), a negative electrode (e.g., an anode) separated from the positive electrode, and an optional separator between the electrodes, with an SEI layer forming at a surface of the electrodes. The electrolyte solution is in contact with the positive electrode and the negative electrode, but may be positioned in the separator. By way of example, the energy storage device may be a lithium battery containing the electrolyte solution.

It is therefore an object to provide an electrolyte solvent formulation comprising: a phosphoranimine; a phosphazene; and optionally a monomeric phosphorus compound. The formulation preferably has a melting point below 0° C. The formulation preferably has a vapor pressure of combustible components at 60.6° C. sufficiently low to not produce a combustible mixture in air (the "flash point"), e.g., a vapor pressure of less than 40 mmHg at 30° C. The phosphoranimine, phosphazene, and monomeric phosphorus compounds preferably has no direct halogen-phosphorus bonds.

It is a still further object to provide an electrolyte solvent formulation comprising: a phosphoranimine; and a phosphazene; having a melting point below 0° C., and a vapor pressure of combustible components at 60.6° C. sufficiently low to not produce a combustible mixture in air, wherein none of the phosphoranimine and phosphazene compounds has any direct halogen-phosphorus bonds.

The formulation preferably comprises a supporting salt having a concentration of at least 0.1M charge carrier ions. The supporting salt, may comprise a supporting lithium salt effective to render the electrolyte solvent formulation suitable for use as an electrolyte in a lithium-ion battery, e.g., $LiPF_6$.

The monomeric phosphorus compound may comprise a phosphate, phosphonate, phosphinate, or phosphine. The MP preferably has at least two different types of pendent groups. The monomeric phosphorus compound may comprise an organophosphate compound in an amount sufficient to achieve a viscosity of the formulation of less than about 30 cp at 35° C.

The monomeric phosphorus compound may be present in an amount of between 10% and 50% by volume.

The phosphoranimine typically has the structure: X—N═P($R^1$, $R^2$, $R^3$), wherein X, $R^1$, $R^2$, and $R^3$ are independently selected from the group consisting of inorganic and organic functional groups, wherein $R^1$, $R^2$, and $R^3$ are represented by at least two different substituents. X may be selected from the group consisting of an organosilyl group and a tert-butyl group. $R^1$, $R^2$, and $R^3$ may be independently selected from the group consisting of an alkoxy group, and an aryloxy group.

The phosphazene may comprise a plurality of phosphazenes having respectively different pendent group substitution. The phosphazene may comprise a substituted phosphazene having substituents selected from the group consisting of alkoxy and fluorinated alkoxy groups. The substituted phosphazene may comprise at least one of an ethoxy substituent and a 2,2,2-trifluoroethoxy substituent. The phosphazene may be present in an amount of between 0.1% and 50% by volume, and preferably in an amount of between 10% and 20% by volume.

The formulation preferably comprises less than about 2% by weight of organic compounds consisting essentially of at least one of carbon, hydrogen, and oxygen.

The phosphoranimine is preferably present in an amount of between 20-50% by volume, the phosphazene is preferably present in an amount of between 3-15% by volume, and the monomeric phosphorus compound is preferably present in an amount of 20-50% by volume.

The formulation may be provided with a battery or other energy storage device, having an anode, a cathode, a separator, and a supporting salt.

In a battery, a solid electrode interphase layer consisting essentially of breakdown products of at least one of the phosphoranimine, the phosphazene, and the monomeric phosphorus compound forms near the electrodes.

It is another object to provide an electrolyte for use in a lithium battery, which is liquid at 0° C., comprising a supporting lithium salt, and a solvent comprising less than about 2% purely organic compounds consisting essentially of carbon, hydrogen and oxygen. The electrolyte preferably has a vapor pressure of less than 40 mmHg at 30° C. The electrolyte may be provided in combination with: an anode, a cathode, and a separator configured to separate the anode and the cathode and permit lithium-ion permeability therethrough. A solid electrolyte interphase layer selectively forms near a surface of the anode and cathode from degradation products of the electrolyte. The formed solid electrolyte interphase layer is preferably stable for at least 245 days at 60° C. The electrolyte preferably comprises a phosphoranimine, a phosphazene, optionally a monomeric phosphorus compound, and the supporting lithium salt. The solid electrolyte interface layer formed by the electrolyte with the electrodes is more preferably thermally stable ≥80° C. At least one of the phosphoranimine and the phosphazene may comprise a plurality of different phosphoranimines or different phosphazenes having a plurality of respectfully different substituents.

The electrolyte preferably comprises between 0.1% and 50% of the phosphazene by volume and between 10% and 20% of the phosphazene by volume. The electrolyte optionally comprises the up to 50% by volume of the monomeric phosphorus compound.

A further object provides a rechargeable lithium-ion battery, comprising an anode, a cathode, a separator, an electrolyte, a supporting lithium salt, and a solid electrolyte interphase layer, the electrolyte comprising at least one phosphoranimine, at least one cyclic phosphazene, and at least one organophosphate, wherein the electrolyte has a viscosity of ≤30 cp at 35° C., a concentration of lithium ions of at least 0.2M, and a vapor pressure of ≤40 mmHg at 30° C., wherein the solid electrolyte interphase layer is formed by degradation of the electrolyte in proximity to the cathode and the anode and is stable against degradation at 65° C.

It is further object to provide a lithium-ion battery having an operating temperature range which extends beyond 0° C. to 50° C., and has an electrolyte viscosity of less than 30 cp within the operating temperature range.

It is another object to provide a method of forming a battery, comprising: providing an anode, a cathode, a separator, and a electrolyte solvent formulation comprising: a phosphoranimine, a phosphazene; and a supporting salt, the solvent formulation having a melting point below 0° C., and a vapor pressure of combustible components at 60.6° C. sufficiently low to not produce a combustible mixture in air, wherein none of the phosphoranimine, and phosphazene has any direct halogen-phosphorus bonds; and cycling the battery at to form a solid electrolyte interface formed from products of the phosphoranimine and phosphazene. The electrolyte solvent may further comprise a monomeric phosphorus compound, e.g., a, organophosphate. The electrolyte solvent formulation preferably has a viscosity of less than about 30 cp at 35° C.

DETAILED DESCRIPTION OF THE INVENTION

Figure 1:
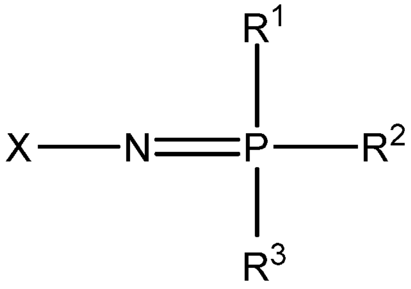
FIG. 1 is the basic chemical structure of the primary phosphoranimine from which other derivatives may be derived by replacement of X, $R^1$, $R^2$, and $R^3$ with various function groups as described within the claims herein.

The PA and Pz compounds are considered inorganic compounds due to their phosphorus-nitrogen (P═N) parent structure. The MP component is considered inorganic due to the core P atom in the parent structure as the primary atom that substituent atoms or molecules are bonded as defined by IUPAC.

The technology involves the preparation of a totally inorganic electrolyte which may have application in lithium-ion batteries. It employs an admixture of a lower molecular weight phosphorus-based compounds, from the class of molecules known as the PAs as the principal solvent and a higher molecular weight phosphorus-based compound, from the class of molecules known as the Pzs as a co-solvent, as well as a suitable supporting salt (such as $LiPF_6$, etc.) to formulate the novel electrolyte. This particular combination of substances obviates the well-known safety and longevity problems associated with current organic-based technologies, while offering numerous other benefits to battery reliability and performance. An MP compound may be provided which, e.g., serves as a viscosity reducer for the solution.

Compared to other organophosphorous compounds and other additives, Pzs showed the least degradation in battery performance. A key performance consideration is ionic conductivity of the solvent. The rate of ion transfer is influenced by the ionic conductivity of the electrolyte solvent. The conductivity itself is generally inversely proportional to the viscosity of the solvent—a less viscous fluid will transfer lithium ions more readily. Carbonates and other organic electrolyte solvents are generally well known to be good ionic conductors due to their low viscosity. However, they break down easily at elevated temperatures, as low as 50° C., which can easily be experienced during normal battery operation. This creates residue within the electrolyte that reduces the ionic conductivity, increases the viscosity, and potentially leads to runaway thermal events. The PA/Pz solvent mixture in this invention is designed to be a suitable carrier of lithium ions while improving the battery's safety and longevity.

PA possess the requisite high lithium salt solubility and low viscosity while Pz offer benefits to the electrochemical performance and formulation stability required to realize the next generation of lithium-ion batteries. Taken together, this new electrolyte formulation allows for a totally inorganic electrolyte system, superior to current technologies. The Pz co-solvent maintains the high lithium salt solubility and introduces the beneficial properties of significantly improved electrochemical and thermal stability, leading to increased performance. The Pz component has been shown to increase the width of the electrochemical window—the range of voltages where there are no redox reactions occurring in the electrolyte—improving the durability of the battery over a larger range of voltages. As described in Rollins, H. W., Harrup, M. K., Dufek, E. J., Jamison, D. K., Sazhin, S. V., Gering, K. L., & Daubaras, D. L., "Fluorinated Phosphazene Co-solvents for Improved Thermal and Safety Performance in Lithium-ion Battery Electrolytes", Journal of Power Sources, 263, 66-74 (2014), expressly incorporated herein by reference in its entirety, electrolyte solutions of 20% Pz with carbonates extends the electrochemical window up to 1.85V over the baseline 0.85 V window exhibited by carbonate solutions alone. This beneficial trend is should continue for PA/Pz mixtures and PA/Pz/MP mixtures. See also E. J. Dufek, M. L. Stone, D. K. Jamison, F. F. Stewart, K. L. Gering, L. M. Petkovic, A. D. Wilson, M. K. Harrup, H. W. Rollins, "Hybrid Phosphazene Anodes for Energy Storage Applications", J. of Power Sources, 267 (2014) 347-355; and E. J. Dufek, J. R. Klaehn, H. W. Rollins, M. K. Harrup, D. Jamison, "Phosphoranimine-based Battery Electrolytes", J. of Power Sources, pending (2014), each of which is expressly incorporated herein by reference in its entirety.

Both PA and Pz, as well as MP, have very low thermal degradation rates compared to pure carbonate electrolytes. Pz alone can act as a "free-radical sponge" when used in carbonate electrolytes to slow their thermal degradation. In Rollins et al (2015) supra, solutions containing only organic carbonate electrolytes completely degrade after about 55 days of being held at 60° C., leaving a black solid residue. Solutions containing both organic carbonate and quantities of Pz retained much of the carbonate through 245 days held at the same temperature, and only showed slight discoloration. Pz as a co-solvent with PA would be expected to further diminish the effects of degradation of the solvent in this invention.

Both solvents have lower vapor pressures than that of typical organic solvents including but not limited to ethylene carbonate, ethyl methyl carbonate, and diethyl carbonate. PA and Pz are well-known for their flame retardant properties and possess high thermal stability. These features provide lower volatility, lower flammability and greater thermal stability than current organic lithium-ion battery solvents.

An MP compound, for example a simple alkyl or aryl derivative of phosphate ((R'O)—(R"O)—(R'''O)—P═O) or phosphine oxide (R'R"R'''P═O), or organophosphonate ((R'O)—(R"O)—(R''')—P═O) or ((R'O)—(R")—(R''')—P═O) is provided. The R groups R', R", R''' may be the same or different, for example an alkyl group, an aryl group, an alkoxy group, or an aryloxy group, or a sulfur or nitrogen analogue thereof. These groups may be substituted with halogens, but the MP compound, like the PA and Pz, should lack direct phosphorus-halogen bonds, and all should lack hydroxyl groups. The substituents preferably are different, to reduce packing and suppress the melting point of the MP compound and the electrolyte as a whole. For example, the MP compound may be methanoyl, ethanoyl, isopropanoyl phosphate.

The all-inorganic PA/Pz solvent mixture (optionally including MP) will also improve the stability of the SEI layer. The SEI layer forms during battery charging as a result of the irreversible decomposition of the electrolyte at the surface of the electrode, creating a thin solid layer on the electrode. Once formed, the SEI layer isolates the electrode surface from the bulk solvent as the SEI layer does not readily allow diffusion of free solvent to the electrode surface, preventing further decomposition, and possesses low electrical conductivity. The SEI still allows for ease of lithium ion intercalation to the surface of the electrode to allow for continued battery operation.

The SEI layer will primarily be generated over the first few charging cycles averaging between 100 nm and 1 micron once fully formed. In typical carbonate solvents, the layer will grow slowly through additional cycles through further solvent decomposition that competes with the lithium intercalation, contributing to capacity fade over large number of cycles. The SEI stability is temperature-sensitive, and as the battery heats up as through normal use, the SEI will break down into the electrolyte and re-expose the electrode. The electrode will then readily react with fresh solvent to reform this layer, consuming more of the lithium ions and furthering the capacity fade. The SEI decomposition reaction is also exothermic and can lead to thermal runaway if not controlled. The SEI layers formed from carbonate-based solvents will break down at a relatively low temperature, as low as 55° C., which can easily be realized in typical lithium batteries.

The use of an electrolyte solvent mixture of primary PA solvent and the Pz co-solvent, and optionally MP, improves the stability of the SEI layer. Both PA and Pz have been separately evaluated with organic carbonate-based solvents. Battery cells using PA or Pz mixed with organic carbonate solvents show lower capacity fade compared to organic carbonate-only solvents, indicating that the SEI layer where PA or Pz is present is much more stable than in organic carbonate-only solutions. The solvent mixture will improve stability of the SEI layer as compared to an SEI layer in a carbonate-based battery and be much more stable under high charge/discharge rates.

Another benefit that the PA/PZ solvent mixture (optionally with MP) has in regards to the SEI layer is in improving the ionic conductivity of the SEI layer due to Pz. Battery cells using organic carbonate solutions have been evaluated via impedance spectroscopy with and without the addition of Pz. The impedance of the SEI layer is reduced when Pz is present in the electrolyte solvent, as well as retaining the higher stability described above. This would make it easier to transfer charge through the layer, allowing for faster discharge rates.

The syntheses of the individual constituents are herein described in detail as a means of non-limiting example.

MP Compound Synthetic Pathway

The MP compounds are preferably simple alkyl and/or aryl derivatives of organophosphates and/or organic phosphine oxides and/or organic phosphonates. Organophosphates are widely employed both in natural and synthetic applications because of the ease with which organic groups can be linked together. Organophosphates are conveniently synthesized employing light aliphatic or aryl alcohols according to the general reaction scheme given below:

$$OP(OH)_3+ROH \rightarrow OP(OH)_2(OR)+H_2O$$

$$OP(OH)_2(OR)+R'OH \rightarrow OP(OH)(OR)(OR')+H_2O$$

$$OP(OH)(OR)(OR')+R''OH \rightarrow OP(OR)(OR')(OR'')+H_2O$$

Organophosphinates and phosphonates are phosphate derivatives having one or two phosphorus-carbon bonds, respectively, with the remaining phosphorus bonds being oxygen/ester bonds. They may be prepared, for example, using an Arbuzov sequence or Michaelis-Arbuzov rearrangement, Abramov reaction, Pudovik reaction, Michaelis-Becker reaction, etc., from a corresponding phosphate. See Richardson, Rebekah Marie, New Synthesis and Reactions of Phosphonates, Doctoral Dissertation, U. of Iowa (2012), expressly incorporated herein by reference in its entirety.

Organic phosphine oxides are similar in structure to the organophosphates, except they contain only direct phosphorus-carbon linkages, instead of being bound through a heteroatom, like oxygen. These compounds are also readily synthesized through the two general reaction schemes shown below:

Phosphine oxides are frequently generated as a by-product of the Wittig reaction:

$$R_3PCR'_2+R''_2CO \rightarrow R_3PO+R'_2C{=}CR''_2$$

Another common route to phosphine oxides is the thermolysis of phosphonium hydroxides. In the laboratory, phosphine oxides are usually generated by the oxidation, often accidentally, of tertiary phosphines: $R_3P+1/2O_2 \rightarrow R_3PO$ As in the case with the organophosphates, the R-groups may be any light aliphatic or aryl group, and most preferred is for each molecule to have a plurality of differing groups attached to the same central phosphorus.

PA Synthetic Pathway

The synthesis of PAs for this purpose was accomplished using the established Neilson and Wisian-Neilson methods. The synthetic route includes the preparation an initial aminophosphine which is then oxidized to the corresponding PA using elemental bromine. Maximization of $LiPF_6$ solubility was accomplished by substituting the subsequent bromine group(s) on the $P^V$ center with various alkyl and etheric oxygen-containing pendant groups.

Pz Synthetic Pathway:

In an oven dried 500 ml flask, 50 g (0.144 moles) of the hexachlorocyclotriphosphazene trimer was dissolved in ~300 ml anhydrous dioxane which was then added to the a solution of sodium ethoxide (under nitrogen at room temperature) and heated at sub-reflux for 5 hours and the reaction progress was monitored by $^{31}P$ NMR. This solution was then cooled to room temperature and then added to a solution of sodium trifluoroethoxide (at RT under nitrogen). This solution was heated to sub reflux for ~5 hours. This reaction was also followed by $^{31}P$ NMR. When the reaction was complete, the solution was allowed to cool to room temperature and the excess ethoxides were quenched with water. The solution was neutralized with 2 M HCl. The solvent was removed by rotary evaporation leaving the Pz product (a liquid) and undissolved solid sodium chloride. The product separated from the salt by decantation and taken up in dichloromethane and washed with nanopure (18 MΩ cm) water in a separatory funnel six times to remove trace impurities. The dichloromethane was removed from the product on a rotary evaporator and the product was then dried in an argon purged vacuum oven for several days, refreshing the atmosphere with fresh UHP argon daily.

Although both classes of phosphorus compounds have been previously investigated individually, this work has been founded on the use of these compounds individually in combination with traditional organic carbonate-based solvents in an attempt to reduce the shortcomings of use of these solvents. According to the present technology, organic carbonates are generally excluded as a substantial component of the formulation altogether, to form a new all-inorganic electrolyte. For example, <2% of the solvent is organic carbonates. This electrolyte is compatible with most known lithium-ion battery components in widespread use today. These include the anode, the cathode, electrode binders, and the mechanical separator, as well as common casing components. As such, the overall processes and key materials for the commercial manufacture of lithium-ion batteries are unaltered from current methodologies. The embodiment of this invention is a lithium-ion based battery system that uses an electrolyte mixture of one or more PA components as the primary solvent, and one or more Pz components as the co-solvent. In the preferred embodiment, the mixture is composed primarily of one or more PA components (that is, Pz components comprising less than 50% of the solvent by volume). In a more preferred embodiment, the Pz components are present in the range of 10 to 20% by volume.

Figure 2:
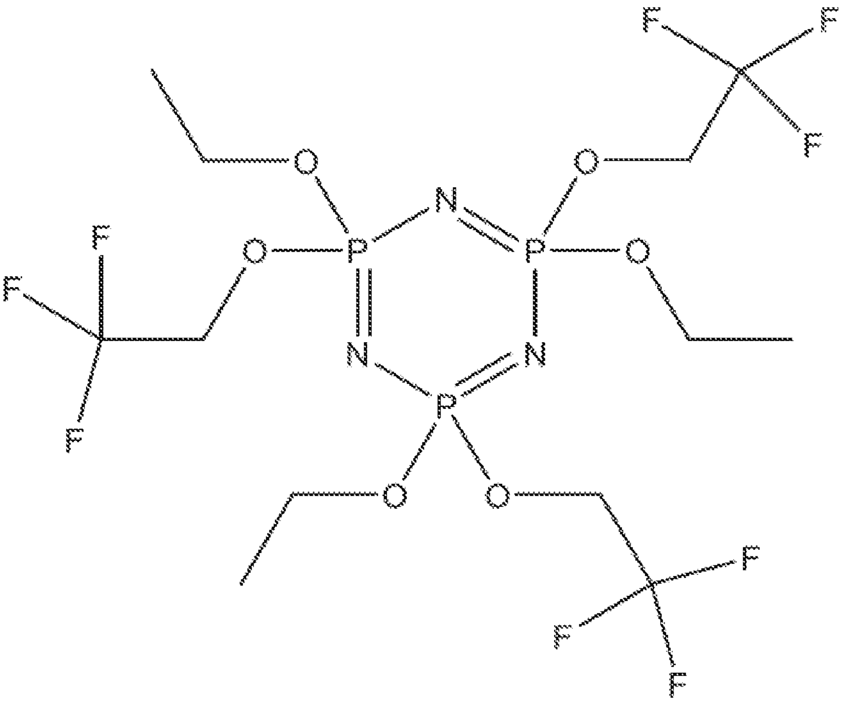
FIG. 2 is the example chemical structure of the co-solvent phosphazene, in this example, an embodiment using ethoxy and 2,2,2-trifluoroethoxy functional groups.

US Patent Application No. 20150340739 describes an embodiment of the PA. In the preferred embodiment, the PA includes at least one PA compound which has the chemical structure as shown in FIG. 1, where X is an organosilyl group or a tert-butyl group and each of $R^1$, $R^2$, and $R^3$ is independently selected from the group consisting of an alkyl group, an aryl group, an alkoxy group, or an aryloxy group. In another embodiment, each of $R^1$, $R^2$, and $R^3$ is independently selected from a cationic pendant group, which includes but is not limited to an ionic form of an aromatic amine, an aryl amine, or an aliphatic amine, such as a nitrogen containing aryl group, a primary amine, a secondary amine, or a tertiary amine. The aromatic amine may be an aniline group. The nitrogen containing aryl group may include, but is not limited to, a pyrrole group, an imidazole, a pyrazole, a pyridine group, a pyrazine group, a pyrimidine group, or a pyridazine group. The PA compound, or mixture thereof, is designed to meet desired properties for lithium-ion batteries, including low viscosity, high ionic conductivity, low vapor pressure, and non-flammability In the embodiment, the Pz mixture includes at least one cyclic Pz compound, having a 6-membered alternating P-N ring structure, and with each phosphorus atom having 2 constituent functional groups attached to it. An example is shown in FIG. 2. In a more preferred embodiment, these functional groups include a combination of alkoxy and fluorinated alkoxy groups, as described in Rollins, Harry W., Mason K. Harrup, Eric J. Dufek, David K. Jamison, Sergiy V. Sazhin, Kevin L. Gering, and Dayna L. Daubaras. "Fluorinated phosphazene co-solvents for improved thermal and safety performance in lithium-ion battery electrolytes." Journal of Power Sources 263 (2014): 66-74, expressly incorporated herein by reference in its entirety. One example of this preferred embodiment, is where these groups are, respectively, ethoxy ($CH_3$—$CH_2$—O—) and 2,2,2-trifluoroethoxy ($CF_3$—$CH_2$—O—).

In some embodiments, inorganic MP compounds are added for the purpose of further lowering the viscosity of the PA/Pz electrolyte mixture, while enhancing ionic conductivity. This is done to address some energy storage applications that demand a very fast charge/discharge rate (typically >3 C). The purpose for the selection of these inorganic-based compounds is three-fold. First, it maintains the all-inorganic nature of the electrolyte blend as previously asserted in this application. Second, one of the areas where PA and Pz compounds decompose into MP species is during the formation of the SEI layer during battery operation. As such, addition of these compounds will not adversely affect the SEI composition over a pure PA/Pz formulation, while retaining all of the desired beneficial electrical and physical properties inherent in the PA/Pz mixture. Third, these compounds are known to have a lower viscosity than either PA or Pz alone, achieving a total lower viscosity for the electrolyte formulation. In a preferred embodiment, the MP compounds will be present up to 20% by volume in the PA/Pz mixture.

EXAMPLE

A model of a lithium-ion battery using the mixture of PA and Pz were developed based on existing data on the characterization and testing of PA and Pz components, specifically referred to as PA2 and FM2, respectively. Parameters for the model using an equivalent circuit model were determined from data regression of impedance testing of FM2 in electrolyte mixtures, and from physical property values for viscosity and conductivity for PA2 and FM2 determined through experiment. The model used physical property relationships to project the performance of a battery that used only a mixture of PA2 and FM2. This model estimates the hydrodynamic and electrochemical properties of the PA2/FM2 electrolyte solvent and the battery performance using established property correlations for chemical mixtures. These relationships are based on standard trends for normal molecular interactions between compounds. Non-normal behavior can be exhibited in certain circumstances, but does not negate the novelty of this invention. The SEI was modeled from the results of the FM2 experimental data and is shown below for a range of compositions (from 0% to 100% FM2) to gauge the estimated range of performance.

The model was used to calculate the performance of a lithium-ion battery using various mixtures of PA2/FM2 (from 100% to 50% PA) at discharge rates from 1/10 C to 10 C. The following table is the voltage of a single battery cell at various state-of-charge (SOC) levels as a function of the battery electrolyte composition, the anticipated SEI layer composition, and the discharge rate.

TABLE 1

Estimated Battery Voltage during Discharge for Various PA2/FM2 Configurations

| | | Discharge Rate | | | | | | | | | | | |
|---|---|---|---|---|---|---|---|---|---|---|---|---|---|
| | FM2 | 1/10 C Discharge | | | 1 C Discharge | | | 3 C Discharge | | | 10 C Discharge | | |
| Solvent | in SEI | SOC | | | | | | | | | | | |
| Comp. | Layer | 90% | 60% | 20% | 90% | 60% | 20% | 90% | 60% | 20% | 90% | 60% | 20% |
| 0% FM2 | 0% | 4.0470 | 3.8459 | 3.7030 | 3.7046 | 3.5027 | 3.3600 | 2.9419 | 2.7400 | 2.5970 | 0.0273 | 0.0707 | 0.0700 |
| 10% FM2 | 0% | 4.0525 | 3.8506 | 3.7080 | 3.7512 | 3.5500 | 3.4079 | 3.0841 | 2.8822 | 2.7392 | 0.7465 | 0.5445 | 0.4015 |
| | 50% | 4.0583 | 3.8564 | 3.7134 | 3.8096 | 3.6077 | 3.4647 | 3.2570 | 3.0551 | 2.9191 | 1.3230 | 1.1210 | 0.9780 |
| | 100% | 4.0602 | 3.8582 | 3.7146 | 3.8281 | 3.6262 | 3.4832 | 3.3126 | 3.1106 | 2.9676 | 1.5080 | 1.3060 | 1.1630 |
| 25% FM2 | 0% | 4.0575 | 3.8555 | 3.7119 | 3.8011 | 3.5992 | 3.4562 | 3.2315 | 3.0296 | 2.8866 | 1.2378 | 1.3059 | 0.8929 |
| | 50% | 4.0632 | 3.8613 | 3.7183 | 3.8588 | 3.6568 | 3.5138 | 3.4045 | 3.2025 | 3.0595 | 1.8143 | 1.6123 | 1.4693 |
| | 100% | 4.0651 | 3.8631 | 3.7202 | 3.8773 | 3.6753 | 3.5324 | 3.4600 | 3.2580 | 3.1150 | 1.9993 | 1.7974 | 1.6544 |
| 35% FM2 | 0% | 4.0603 | 3.8584 | 3.7154 | 3.8294 | 3.6275 | 3.4845 | 3.3164 | 3.1145 | 2.9715 | 1.5029 | 1.3190 | 1.1760 |
| | 50% | 4.0660 | 3.8641 | 3.7211 | 3.8871 | 3.6851 | 3.5422 | 3.4894 | 3.2874 | 3.1444 | 2.0974 | 1.8954 | 1.7524 |
| | 100% | 4.0679 | 3.8660 | 3.7230 | 3.9056 | 3.7037 | 3.5607 | 3.5441 | 3.3429 | 3.1999 | 2.2824 | 2.0805 | 1.9375 |
| 50% FM2 | 0% | 4.0638 | 3.8619 | 3.7189 | 3.8650 | 3.6622 | 3.5200 | 3.4230 | 3.2211 | 3.0785 | 1.8762 | 1.6743 | 1.5313 |
| | 50% | 4.0696 | 3.8677 | 3.7247 | 3.9226 | 3.7207 | 3.5777 | 3.5960 | 3.3940 | 3.2510 | 2.4527 | 2.2507 | 2.1077 |
| | 100% | 4.0715 | 3.8695 | 3.7270 | 3.9411 | 3.7392 | 3.5966 | 3.6515 | 3.4495 | 3.3065 | 2.6377 | 2.4358 | 2.2928 |

Figure 3:
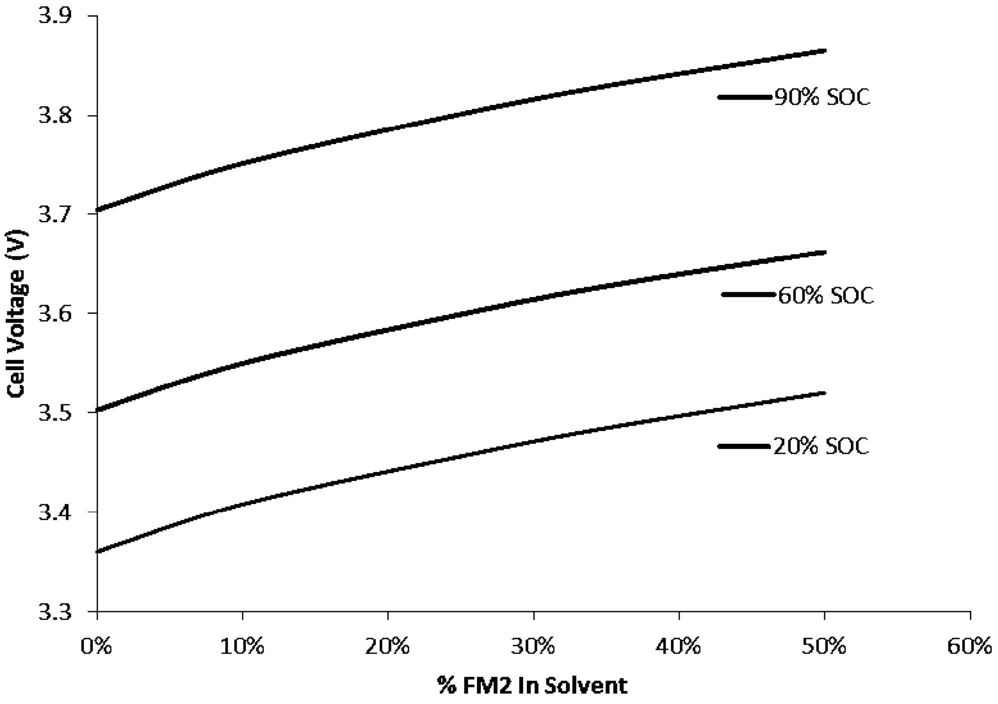
FIG. 3 shows the benefits of low levels of FM2 (~10%) on battery performance.

Actual data shows that the base PA2 solvent will have a sufficiently low viscosity and corresponding high ionic conductivity to make it a suitable electrolyte in lithium battery applications at low discharge rates, when salted to a relevant level with a typical lithium salt, such as $LiPF_6$. Using this data, the model shows that pure PA2 viscosity may not be sufficient as a pure solvent for high discharge rates (greater than 3 C). Addition of FM2 will increase the electrolyte thermal and electrochemical stability and can reduce the impedance of the solvent, improving the battery's performance. From this model, the benefit is apparent with low levels of FM2 (~10%) and suggests diminishing returns at higher levels. FIG. 3 shows this influence. The model does not presently include the influence of MP compounds, which are expected to further depress the solution's viscosity without altering the other benefits of the PA2/FM2 (PA/Pz) mixture. The performance of batteries using the PA2/FM2/MP compounds would be expected to be better than what is shown in this model results for PA2/FM2 alone.

Figure 4:
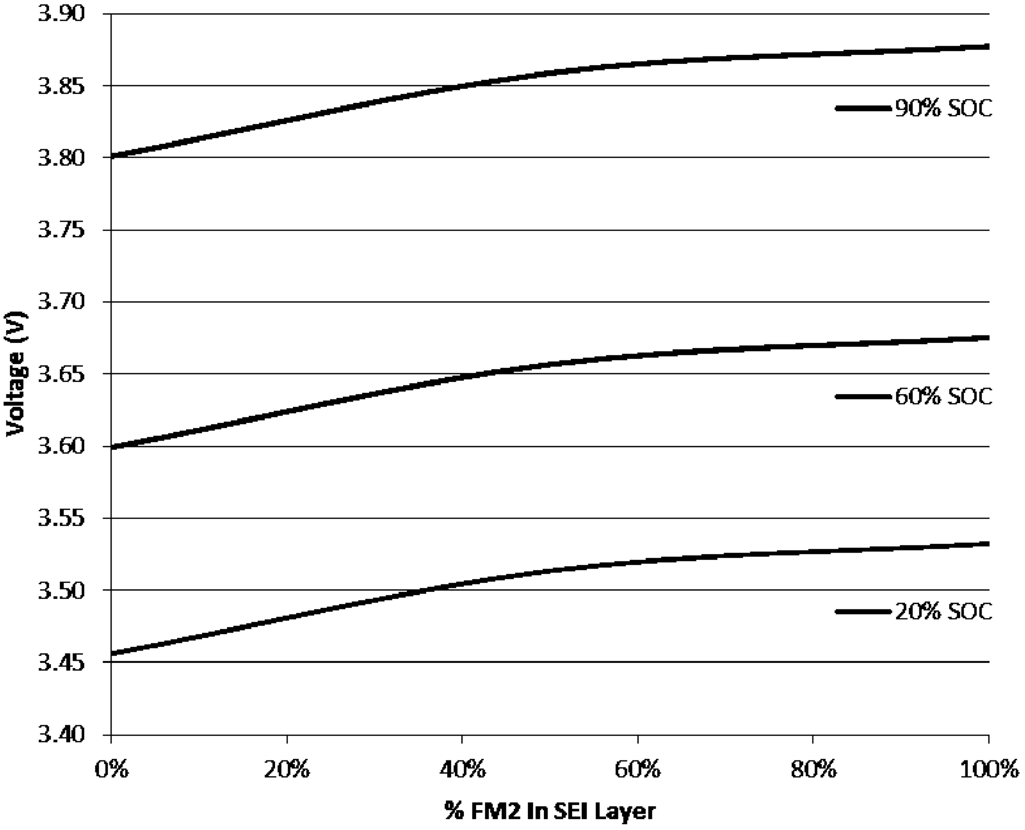
FIG. 4 shows that the presence of FM2 in SEI layer is beneficial to the battery.

Similarly, the presence of FM2 in SEI layer is beneficial to the battery, as it appears the material offers lower resistance to ionic transfer to the electrodes, as shown in FIG. 4. Only a small amount of FM2 is required to achieve this, FM2 was added to carbonate solvents; additional FM2 beyond 50% within the SEI layer appears to have diminishing returns.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. The scope of the disclosure is intended to encompass all combinations, subcombinations, and permutations of the various disclosures herein (regardless of whether in multiple-dependent format), and unless specifically limited by the claims, no particular aspect is considered essential. Likewise, the invention comprises materials and methods that facilitate production of an end product and portions of the end product. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

What is claimed is:

1. A battery, comprising:

a metal anode;

an electrolyte consisting essentially of:

a cyclic phosphazene having at least one fluorinated substituent, in an amount of 10-50% by volume, an optional phosphoranimine compound, an optional monophosphorus compound, and an organic carbonate-based solvent, the electrolyte being substantially without:

a phosphoranimine compound comprising an organosilyl or tert-butyl ligand of the phosphoranimine nitrogen, a compound having a direct halogen-phosphorus bond, and a compound having a hydroxyl group;

a cathode;

a metal salt; and a dynamic solid electrolyte interface layer on the metal anode comprising breakdown products of the cyclic phosphazene and the organic carbonate-based solvent, wherein the solid electrolyte interface layer is adapted to break down and reform on the metal anode from battery cycling, wherein the cyclic phosphazene acts at least as a free radical sponge to slow thermal degradation of the organic carbonate-based solvent.

2. The battery according to claim 1, wherein the metal anode is a lithium metal anode, the metal salt comprises a lithium salt, and the cathode comprises a lithium ion intercalation cathode material.

3. The battery according to claim 1, wherein the organic carbonate-based solvent comprises at least one of dimethyl carbonate, ethylene carbonate, and ethyl methyl carbonate.

4. The battery according to claim 1, wherein the electrolyte further comprises monophosphorus compound.

5. The battery according to claim 1, wherein the electrolyte comprises between 10% and 20% by volume of the cyclic phosphazene 2,2,2-trifluoroethoxy-2,2,2-ethoxy cyclotriphosphazene (FM2)

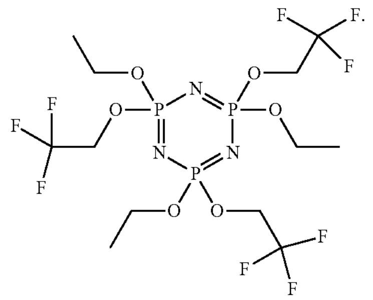 [SMILES: CCOP1(OCC(F)(F)F)=NP(OCC)(OCC(F)(F)F)=NP(OCC)(OCC(F)(F)F)=N1]

6. The battery according to claim 1, wherein the metal salt achieves a charge carrier density in the electrolyte of at least 0.1M.

7. The battery according to claim 1, wherein the metal salt comprises $LiPF_6$.

8. The battery according to claim 1, wherein the cyclic phosphazene comprises substituents selected from the group consisting of alkoxy and fluorinated alkoxy groups.

9. The battery according to claim 1, wherein the cyclic phosphazene comprises at least one of an ethoxy substituent and a 2,2,2-trifluoroethoxy substituent.

10. The battery according to claim 1, where the cyclic phosphazene is present in an amount of between 20-50% by volume of the electrolyte.

11. A battery, comprising:

a lithium metal anode;

an electrolyte comprising 2,2,2-trifluoroethoxy-2,2,2-ethoxy cyclotriphosphazene (FM2), in an amount of at least 10% and up to 20% by volume, and an organic carbonate-based solvent, substantially without a phosphoranimine compound comprising an organosilyl or tert-butyl ligand of the phosphoranimine nitrogen, wherein the electrolyte lacks compounds having direct halogen-phosphorus bonds and compounds having hydroxyl groups; and a solid electrolyte interface layer dynamically formed and reformed on the lithium metal anode from at least the FM2 and the organic carbonate-based solvent during cycling of the battery comprising breakdown products of the FM2.

12. The battery according to claim 11, further comprising a lithium ion intercalation cathode.

13. The battery according to claim 12, further comprising a lithium salt, wherein the organic carbonate-based solvent comprises at least one of dimethyl carbonate, ethylene carbonate, and ethyl methyl carbonate.

14. The battery according to claim 13, further comprising a monophosphorus compound that lacks direct halogen-phosphorus bonds and hydroxyl groups.

15. The battery according to claim 11, further comprising a lithium salt.

16. The battery according to claim 11, where the solid electrolyte interface layer is stable against degradation at 65° C. FM2 is present in an amount at least.

17. A battery, comprising:

a metal anode;

an electrolyte consisting essentially of a 2,2,2-trifluoroethoxy substituted cyclic phosphazene, an organic solvent, and non-phosphoranimine additives;

a cathode;

a supporting salt;

a solid electrolyte interface layer on the metal anode comprising breakdown products of the 2,2,2-trifluoroethoxy substituted cyclic phosphazene, the organic solvent, and the non-phosphoranimine additives, wherein the solid electrolyte interface layer breaks adown and reforms on the metal anode during discharge and recharge of the battery, acts as an efficient free radical quencher, and provides an effective barrier that protects the bulk electrolyte from continuous degradation, wherein the electrolyte lacks compounds having direct halogen-phosphorus bonds and compounds having hydroxyl groups.

18. The battery according to claim 17, wherein the metal anode is a lithium metal anode, the supporting salt comprises a lithium salt, and the cathode comprises a lithium ion intercalation cathode material.

19. The battery according to claim 18, wherein the organic solvent at least one of dimethyl carbonate, ethylene carbonate, and ethyl methyl carbonate.

20. The battery according to claim 18, where the solid electrolyte interface layer is thermally stable at 80° C.

* * * * *